(12) United States Patent
Balsara et al.

(10) Patent No.: US 8,465,883 B2
(45) Date of Patent: Jun. 18, 2013

(54) NANOSTRUCTURED POLYMER MEMBRANES FOR PROTON CONDUCTION

(75) Inventors: Nitash Pervez Balsara, El Cerrito, CA (US); Moon Jeong Park, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 330 days.

(21) Appl. No.: 12/667,219

(22) PCT Filed: Jun. 30, 2008

(86) PCT No.: PCT/US2008/008159
§ 371 (c)(1),
(2), (4) Date: Jul. 23, 2010

(87) PCT Pub. No.: WO2009/011753
PCT Pub. Date: Jan. 22, 2009

(65) Prior Publication Data
US 2011/0053043 A1     Mar. 3, 2011

Related U.S. Application Data

(60) Provisional application No. 60/959,321, filed on Jul. 11, 2007, provisional application No. 61/065,560, filed on Feb. 12, 2008.

(51) Int. Cl.
*H01M 8/10* (2006.01)
(52) U.S. Cl.
USPC ............................ 429/493; 429/492; 525/212
(58) Field of Classification Search
USPC .................................. 429/493, 492; 525/212
See application file for complete search history.

(56) References Cited

U.S. PATENT DOCUMENTS 7,318,974 B2 *  1/2008  Ohara et al. .................. 429/437
7,816,041 B2 * 10/2010  Osaka et al. .................. 429/400
(Continued)

FOREIGN PATENT DOCUMENTS
WO      2009/011753        1/2009
WO   WO-2009-011753 A2 *  1/2009

OTHER PUBLICATIONS

Elabd et al., (2006) "Transport Properties of Sulfonated Poly(styrene-b-isobutylene-b-styrene) Triblock Copolymers at High Ion-Exchange Capacities", Macromolecules, vol. 39, pp. 399-407.*

(Continued)

*Primary Examiner* — Peter D. Mulcahy
*Assistant Examiner* — Henry Hu
(74) *Attorney, Agent, or Firm* — Weaver Austin Villeneuve & Sampson LLP

(57) ABSTRACT

Polymers having an improved ability to entrain water are characterized, in some embodiments, by unusual humidity-induced phase transitions. The described polymers (e.g., hydrophilically functionalized block copolymers) have a disordered state and one or more ordered states (e.g., a lamellar state, a gyroid state, etc.). In one aspect, the polymers are capable of undergoing a disorder-to-order transition while the polymer is exposed to an increasing temperature at a constant relative humidity. In some aspects the polymer includes a plurality of portions, wherein a first portion forms proton-conductive channels within the membrane and wherein the channels have a width of less than about 6 nm. The described polymers are capable of entraining and preserving water at high temperature and low humidity. Surprisingly, in some embodiments, the polymers are capable of entraining greater amounts of water with the increase of temperature. The polymers can be used in Polymer Electrolyte Membranes in fuel cells.

16 Claims, 27 Drawing Sheets

U.S. PATENT DOCUMENTS

2003/0003345 A1* 1/2003 Ohara et al. .................. 429/38
2006/0159972 A1 7/2006 Nodono
2007/0059580 A1* 3/2007 Budinski et al. ............... 429/35

OTHER PUBLICATIONS

Kim et al., (2002) "Proton conductivities and methanol permeabilities of membranes made from partially sulfonated polystyrene-block-poly (ethylene-ran-butylene)-block-polystyrene copolymers", Journal of Membrane Science, vol. 207, pp. 129-137.*

Park et al., (2007) "Increased Water Retention in Polymer Electrolyte Membranes at Elevated Temperatures Assisted by Capillary Condensation", Nano Letters, vol. 7, No. 11, pp. 3547-3552.*

Elabd et al., (2006) "Transport Properties of Sulfonated Poly(styrene-b-isobutylene-b-styrene) Triblock Copolymers at High Ion-Exchange Capacities", Macromolecules, 39:399-407.*

Kim et al., (2002) "Proton conductivities and methanol permeabilities of membranes made from partially sulfonated polystyrene-block-poly (ethylene-ran-butylene)-block-polystyrene copolymers", Journal of Membrane Science, 207:129-137.*

Kim et al., Nov. 2003 "Effect of acidification treatment and morphological stability of sulfonated poly(arylene ether sulfone) copolymer proton-exchange membranes for fuel-cell use above 100° C", J. Polym. Sci., B: Polymer Physics vol. 41, Iss. 22:2816-2828.*

Nakano T. et al., Oct. 2005 "Preparation of novel sulfonated block copolyimides for proton conductivity membranes" Polym. Adv. Technol. vol. 16, Iss. 10:753-757.*

Hanley et al., (2000), "Phase Behavior of a Block Copolymer in Solvents of Varying Selectivity"~ Macromolecules 33: 5918-5931.*

Zhao et al., (1996) "Phase Behavior of Pure Diblocks and Binary Diblock Blends of Poly(ethylene)-Poly(ethylethylene)", Macromolecules 29:1204-1215).*

Sun et al., (2004) "Self-assembly and crystallization behavior of a double-crystalline polyethylene-block-poly (ethylene oxide) diblock copyolymer", Polymer 45:8181-8193.*

Park et al., (2008) "Humidity-Induced Phase Transitions in Ion-Containing Block Copolymer Membranes", Macromolecules 41:2271-2277.*

Adams et al., (1998) "Interaction Strength in Styrene-Diene Block Copolymers and Their Hydrogenated Derivatives", *Macromolecules* 31:201-204.

Hanley et al., (2000), "Phase Behavior of a Block Copolymer in Solvents of Varying Selectivity", *Macromolecules* 33:5918-5931.

Tan et al., (1995) "Immiscibility in Polystyrene/Sulfonated Polystyrene Blends", *Polymer*, vol. 36, No. 10:1969-1973.

Kim et al., (2002) "Proton conductivities and methanol permeabilities of membranes made from partially sulfonated polystyrene-block-poly (ethylene-ran-butylene)-block-polystyrene copolymers", *Journal of Membrane Science*, 207:129-137.

Park et al., (2007) "Increased Water Retention in Polymer Electrolyte Membranes at Elevated Temperatures Assisted by Capillary Condensation", *Nano Letters*, vol. 7, No. 11: 3547-3552.

Park et al., (2008)"Phase Behavior of Symmetric Sulfonated Block Copolymers", *Macromolecules* 41:3678-3687.

Park et al., (2007) "Structure and Phase Transition in Sulfonated Block Copolymer", Abstract Submitted for the Mar. 2007 Meeting of the American Physical Society, 1 page.

International Search Report and Written Opinion for PCT/US2008/008159, mailed Jul. 6, 2009 [LBNLP030WO].

Chen et al., Dec. 1998 "Equilibrium Swelling of Hydrophilic Polyacrylates in Humid Environments", *Macromolecules* vol. 32:136-144.

Balsara, N. P. Dec. 1998 "Multicomponent Polyolefin Blends with Ordered and Disordered Microstructures" *Curr Opin Solid State Mater Sci*, vol. 3, Iss. 6:589-595.

Park et al., Mar. 8, 2007 "Structure and Phase Transition in Sulfonated Block Copolymers" *APS March Meeting Slides*, University of California, Berkeley. 11 Slides.

Park et al, Jan. 2008 "Block Copolymer Electrolytes for Fuel Cells", *Presentation Slides at Arkema*. 35 Slides.

* cited by examiner

NANOSTRUCTURED POLYMER MEMBRANES FOR PROTON CONDUCTION

CROSS-REFERENCE TO RELATED APPLICATIONS

This application is a US National Stage entry under 35 U.S.C. 371 of the International Patent Application No. PCT/US08/08159 filed on Jun. 30, 2008, which claims the benefit of a filing date of U.S. Provisional Patent Application No. 60/959,321 naming Park et al. as inventors, titled "Nanostructured Polymer Membranes for Proton Conduction" filed Jul. 11, 2007 and the benefit of a filing date of U.S. Provisional Patent Application No. 61/065,560 naming Park et al. as inventors, titled "Nanostructured Polymer Membranes for Proton Conduction" filed Feb. 12, 2008, the disclosures of which are herein incorporated by reference in their entirety and for all purposes.

STATEMENT OF GOVERNMENTAL SUPPORT

This invention was made with government support under Contract No. DE-AC02-05CH11231 awarded by the United States Department of Energy to The Regents of the University of California for the management and operation of the Lawrence Berkeley National Laboratory. The government has certain rights in this invention.

FIELD OF THE INVENTION

The invention relates to polymer electrolytes. Specifically, the invention relates to polymer electrolyte membranes (PEMs) comprising nanostructured block copolymers.

BACKGROUND OF THE INVENTION

Polymer electrolyte membranes (PEMs) are used in fuel cells to provide proton conductivity between the fuel cell electrodes. In a typical polymer-electrolyte fuel cell (PEFC), the membrane structurally separates the electrodes of the fuel cell while providing a pathway for proton transport from one electrode to the other. For example in a hydrogen/oxygen fuel cell, hydrogen is catalytically oxidized at the anode side of the membrane-electrode assembly (MEA) forming $H^+$ ions according to reaction (1).

$$H_2 \rightarrow 2H^+ + 2e^- \qquad (1)$$

The formed protons permeate through the polymer electrolyte membrane to the cathode side, while electrons move along an external load circuit creating the current output of the fuel cell. At the cathode side of the MEA, reduction of oxygen occurs according to reaction (2).

$$4H^+ + 4e^- + O_2 \rightarrow 2H_2O \qquad (2)$$

Fuel cells transform the chemical energy liberated during the reaction of hydrogen and oxygen to electrical energy. Potentially, fuel cells can be used to provide power for buildings, transportation vehicles, electronic devices, etc.

The first polymer electrolyte fuel cells (PEFCs) were developed in the early 1960s and have been used in the NASA Gemini series of spacecraft. However, further commercialization of PEFCs beyond aerospace industry has been limited, in part, due to relatively low efficiencies of available PEFCs.

SUMMARY OF THE INVENTION

Efficiency of PEFCs can be increased by operating the fuel cells at higher temperatures. New types of membrane materials suitable for operation at higher temperatures are provided herein.

The proton conductivity of PEMs greatly depends on the ability of the membrane to retain water within the body of the membrane. The membrane may entrain water through a variety of routes, e.g., the membrane may be pre-soaked in water prior to operation, or may absorb water directly from the ambient atmosphere and retain it. The proton conductivity of the membrane correlates with the amount of entrained water, such that well-hydrated membranes exhibit higher proton conductivities than poorly hydrated membranes. Accordingly, polymers that can efficiently entrain water are desired materials for PEM applications.

Conventionally used PEM polymers, such as sulfonated perfluoroalkyl polymers sold under NAFION® trademark (DuPont de Nemours), are prone to water loss at temperatures greater than 60° C. In these conventional PEMs, water loss is particularly pronounced when the membrane operates under low relative humidity (RH) conditions, e.g. at an RH of about 50%. Because operation at high RH is not always practical and may require complex water management systems, there is a need for PEM materials which can maintain high water uptake and high proton conductivities at high temperatures and under low humidity conditions. Such materials and their methods of preparation are described herein. It is understood that while the described materials are particularly advantageous for PEFCs operating at high temperatures and low RHs, the invention is not limited to these particular conditions or applications. The polymeric materials described herein can be used under a variety of conditions, including operation at low temperatures, and in a variety of applications reaching beyond fuel cell applications, e.g., as ion-exchange resins. Another alternative application for the described polymers involves their use in clothing materials to protect the clothes wearer from dehydration in hot and dry environments. In yet another alternative application, the polymers described herein are used in membranes employed in liquid (e.g., water) purification systems. The small size of the channel within the polymer may allow for effective removal of impurities from water. When used in filtration membranes, the described polymers may allow small water molecules to pass through hydrophilic channels, while blocking larger molecules of impurities, or particles. In some aspects, a water purification system having a membrane comprising a polymer as described herein is provided. Operation of such system includes filtering water through polymer-containing membrane, such that impurities are blocked by the membrane, while water is allowed to pass through the membrane.

In one aspect, the invention provides a PEM comprising a plurality of portions, wherein a first portion forms proton-conductive channels within the membrane and wherein the channels have a width of less than about 6 nm. The channels can be formed by a hydrophilically functionalized polymer, e.g., by a sulfonated polymer. It has been discovered that the size of hydrophilic channels within the membrane closely relates to the ability of polymer to entrain water, and, consequently, to the proton conductivity of the PEM. Specifically, it has been discovered that polymers having hydrophilic proton conductive channels with widths of less than about 6 nm are capable of being well hydrated at high temperatures (e.g., at temperatures greater than 60° C., and greater than 80° C.) and at low humidities (e.g., at RH less than about 60%). It has been demonstrated, that polymers with hydrophilic channels of this size exhibit a qualitatively different water retention (and proton conductivity) behavior compared to PEM materials having larger channels.

In some embodiments, the proton-conductive channels have a width of less than about 5 nm, such as less than about 3 nm, e.g., a width of about 2.5 nm. The recited widths refer to an average width of the channel within the polymer. Preferably, but not necessarily, the distribution of channel widths is relatively narrow, e.g., with a deviation of less than about 0.07 nm. Such narrow distribution in channel sizes is observed, for example, in some nanostructured block copolymers which can provide ordered arrays of hydrophilic channels.

In some embodiments, the provided PEM comprises a block copolymer having hydrophilic and structural blocks, e.g., the copolymer may include a hydrophilic conductive block and a hydrophobic structural block. Examples of such polymers include diblock copolymers, where one block is hydrophilically functionalized (e.g., is derivatized with hydrophilic groups, such as —$SO_3H$, —OH, —COOH, etc.) and the other block lacks hydrophilic functional groups (e.g., contains underivatized saturated alkyl moiety). A specific example of such block copolymer is polystyrenesulfonate-block-polymethylbutylene (PSS-b-PMB). In this example, polystyrenesulfonate (PSS) is the hydrophilic proton conductive block and polymethylbutylene (PMB) is the structural hydrophobic block of the copolymer. The PSS-b-PMB copolymer includes sulfonated aryl groups in the PSS block. The sulfonation levels can be adjusted such that proton conductivity of the polymer is optimized while its structural integrity is maintained. For example, in one embodiment, less than about 60% of aryl groups are sulfonated, because at higher sulfonation levels the polymer may dissolve after it absorbs water. On the other hand, an inadequately sulfonated polymer may lack physical integrity. Sulfonation of between about 15-60% of aryl groups, preferably between about 20-55% of aryl groups is preferred for PSS-b-PMB copolymer. One of skill in the art would understand how to adjust sulfonation levels for different block copolymers, such that conductivity is optimized and structural integrity of the polymer is not lost. Examples of other suitable hydrophilically functionalized block-copolymers include without limitation sulfonated polysulfone-block-polyolefins, sulfonated poly(ether sulfone)-block-polyolefins, sulfonated poly(ether ketone)-block-polyolefins, sulfonated poly(ether ether ketone)-block-polyolefins, sulfonated poly(phenyl quinoxaline)-block-polyolefins, sulfonated poly(phenylene sulfide)-block-polyolefins, sulfonated polyimide-block-polyolefins, and perfluorosulfonic acid-block-fluorinated polyolefins.

The block copolymers provided herein are capable of forming ordered nanostructures, with hydrophilic blocks and hydrophobic blocks arranging themselves in ordered arrays. This self-assembly leads to formation of ordered arrays of hydrophilic channels defined by the arrangement of hydrophilic blocks of the copolymer. For example, lamellar and gyroid ordered nanostructures may form. In specific embodiments, the ordered nanostructure exists when the copolymer is hydrated (e.g. when the copolymer has absorbed at least about 20% of water by weight). While the invention is not limited by any particular theory of operation, the presence of ordered nanochannels of a defined size in the hydrated state is believed improve proton conductivity and water retention. In some embodiments lamellar nanostructures are formed in the hydrated PEMs. It is noted, that in general, the proton-conductive channels need not be linear, and proton conductivity can be non-directional, e.g., it can occur through channels of various geometries. Further, the nanostructured polymers need not necessarily have an ordered structure on a macroscale to achieve efficient proton conduction.

As it was mentioned, the polymers having nanoscale hydrophilic channels with widths of less than about 6 nm, and preferably less than about 5 nm, possess dramatically improved water retention properties compared to analogous polymers with larger channel sizes. The size of hydrophilic channels can be controlled by controlling the relative volumes occupied by the hydrophilic and the structural blocks of the co-polymer, and by controlling the size of the copolymer macromolecules. According to some embodiments, copolymers having lower molecular weights afford nanostructures with more narrow hydrophilic channels. For example, PSS-b-PMB block copolymers with molecular weights of less than about 9,000 g/mol, preferably less than about 8,000 g/mol and even less than about 3,500 g/mol have been shown to produce ordered nanostructures with hydrophilic channels having a width of less than about 6 nm. Specifically, PSS-b-PMB copolymer having a molecular weight of about 3,200 g/mol and a volume fraction of hydrophilic portion of about 0.48 forms ordered nanostructures with hydrophilic channels having a width of about 2.5 nm.

The membranes comprising hydrophilic nanochannels with widths of less than about 6 nm have high proton conductivities at high temperatures. For example, proton conductivities of at least about 0.1 S/cm, e.g. at least about 0.15 S/cm are achieved at temperatures of greater than about 60° C. Specifically, proton conductivities of at least about 0.15, e.g., at least about 0.18, are achieved at temperatures of greater than about 80° C. (e.g., at about 90° C.) and a relative humidity of about 98%. Advantageously, good proton conductivities are also achieved under low humidity conditions. Proton conductivities of at least about 0.02 S/cm are observed at a temperature of greater than about 80° C. and an RH of less than about 90%. In some membranes described herein, proton conductivities of at least about 0.03 S/cm (e.g., at least about 0.035 S/cm) at an RH of less than about 60% and at a temperature of greater than about 80° C. are observed. In a specific example, membranes having a conductivity of at least about 0.03 S/cm (e.g., at least about 0.037 S/cm or even greater than about 0.045 S/cm) at a temperature of about 90° C. and an RH of about 50% are provided. These properties are markedly different from conduction behavior of ordered polymers with larger hydrophilic channel sizes.

The membranes having proton conductive channels with widths of less than about 6 nm further possess several advantageous properties which are not encountered in conventionally used membranes. The membranes provided herein can maintain stable conductivities at high temperatures over periods of at least 48 hours. Conventionally used membrane materials, in contrast, often exhibit a relatively high conductivity when the material is first exposed to high temperature but the conductivity significantly decreases over time of exposure. Such instability of conductivity is disadvantageous for fuel cell applications. The membranes provided herein address this problem. An additional desirable feature of membrane materials described herein is that some of these materials are capable of entraining (e.g., absorbing or retaining) a greater amount of water at higher temperature than at a lower temperature. Accordingly, one aspect of the invention provides a PEM comprising a block copolymer having hydrophilic channels, wherein the PEM entrains a greater amount of water at a higher temperature than at a lower temperature. The membranes exhibit this unusual behavior at a constant RH value and in the absence of any external treatments or membrane modifications. Retention of greater amounts of water at higher temperatures further enhances the proton conductivity of membranes at higher temperatures.

According to another aspect of the invention, an MEA which includes PEMs described herein is provided. The MEA includes electrodes positioned at the opposite sides of the membrane. The membrane structurally separates the electrodes and allows for proton transport between the electrodes.

According to another aspect, a method of using an MEA is provided. The method includes, in one embodiment, providing an MEA having a PEM, where the PEM includes a polymer having a plurality of portions. One portion of the polymer forms proton-conductive channels within the membrane, with a width of the channels not exceeding 6 nm. The method further includes operating the MEA under a set of operating conditions, which are selected such that the polymer exists in an ordered state under these conditions.

In some embodiments, the PEMs provided herein include a cross-linked polymer. For example, a hydrophilically functionalized block copolymer having a plurality of hydrophilic channels, wherein at least some channels have widths of less than about 6 nm, may include cross-links (e.g., S—S bonds or C—C bonds) between or within individual polymer chains. Cross-linked polymers can improve mechanical properties of the membranes, providing more robust PEMs. In some embodiments, it is preferable to introduce cross-links within the hydrophobic portions of a block-copolymer, without making cross-links within hydrophilic channels. Cross-linking the hydrophobic block in this manner can improve mechanical properties of the polymer without affecting the proton conductivity of the hydrophilic channels. Methods for selectively cross-linking hydrophobic block in the presence of a hydrophilic block are known to those of skill in the art. For example, cross-linking agents that are selective for chemical bonds within the hydrophobic block may be used. Specifically, when hydrophilic block includes hydrophilically functionalized aromatic moieties, and hydrophobic block includes non-aromatic moieties, S—S and C—C cross-links can be selectively formed within the hydrophobic block by treating the polymer with a cross-linking agent that derivatizes non-aromatic moieties, but leaves aromatic groups intact. For example C—C cross links can be selectively formed within the hydrophobic block containing non-aromatic moieties by treating the polymer with an electron beam.

According to another aspect of the invention, polymers having an improved ability to entrain water can be characterized by unusual humidity-induced phase transitions. These polymers (which can be hydrophilically functionalized block copolymers) have a disordered state and one or more ordered states (e.g., a lamellar state, a gyroid state, etc.). In one aspect, the polymers are capable of undergoing a disorder-to-order transition (DOT) while the polymer is exposed to an increasing temperature at a constant relative humidity (RH). For example, at a first constant relative humidity (e.g., at RH of at least about 50%, at least about 80% or at least about 95%) the polymer will exist in an ordered state at a higher temperature and in a disordered state at a lower temperature. The disorder-to-order transition occurs at a certain threshold temperature at a first relative humidity. Interestingly, the same polymer may show an opposite behavior at a second relative humidity value. Specifically at a second relative humidity (which is typically lower than the first relative humidity, e.g., less than about 50%, or less than about 30%) the same polymer may be capable of undergoing an order-to-disorder transition (ODT), while the polymer is exposed to an increasing temperature at a constant second relative humidity. For example, at a first relative humidity (e.g., at RH of at least about 50%), the polymer may exist in an ordered state at higher temperature and in a disordered state at a lower temperature, while at a second, lower relative humidity (e.g., at RH of less than about 40%) the polymer may exist in a disordered state at a higher temperature and in an ordered state at a lower temperature. It is understood, that ordered states under different RH and temperature conditions need not necessarily be the same (e.g., a gyroid structure may be observed under one set of conditions, while a lamellar structure may be observed under different conditions). In some embodiments, the polymer in the disordered state is a liquid-phase polymer, while the polymer in the ordered state is a solid. In these cases, the polymer is capable of transitioning from a liquid to a solid as it is exposed to increasing temperature under constant first RH. In some embodiments, the DOT occurs in the temperature range of between about 20-200° C.

In some embodiments, a polymer is capable of undergoing a disorder-to-order transition while the polymer is exposed to an increased relative humidity at a constant temperature. In some embodiments, a polymer exists in a disordered state (e.g., in liquid phase) below certain threshold RH and in an ordered state (e.g., in solid phase) above the threshold RH at a constant temperature.

In another embodiment, a polymer having a disordered state and an ordered state is provided. The polymer is capable of entraining water in both states. Surprisingly, in the provided polymers, according to some embodiments, the partial molar entropy of entrained water is greater in the ordered state than in the disordered state.

The described polymers are suitable as PEM components. It is understood, however, that when used in PEMs, the PEMs are typically operated under conditions, where the polymers do not undergo disorder-to-order or order-to-disorder transitions. It is, therefore, understood that while DOTs and ODTs are used for characterization of suitable polymers having improved ability to entrain water, DOTs and ODTs preferably should not occur during membrane use, in order to maintain structural integrity of the membrane.

In accordance with this guideline, the PEM is typically operated under a set of operating conditions where the polymer exists in an ordered state. In some embodiments, an MEA having a PEM is provided. The PEM may include a polymer having any of the characteristics described above. In one aspect, a method of using such MEA is provided. The method includes: (a) providing an MEA having a PEM with a polymer as in any of the embodiments described above and (b) operating the MEA under a set of operating conditions, where the polymer exists in an ordered state. For example, for those polymers which undergo DOT transition at a first constant relative humidity, as the temperature is increased beyond certain threshold temperature, the MEA should be preferably operated above the threshold DOT temperature and/or at RH that is higher than the first RH. For those polymers which undergo an ODT transition at a second RH when the temperature is increased above a certain ODT threshold temperature, the membrane should preferably operate at a temperature that is lower than the threshold ODT temperature and/or at an RH that is lower than the second RH. For those polymers which exhibit a DOT as the RH is increased above a certain DOT RH threshold value at a constant temperature, the MEA should be operated at an RH value that is higher than the DOT threshold for each operating temperature.

It is understood, however, that in some systems (e.g. in cross-linked polymers) both ordered and disordered phases can have structural integrity. For example, in some cross-linked systems a microscopically disordered polymer can be a solid on a macroscopic level. In these systems, ODTs and DOTs can be viewed as transitions between two solids having different microscopic structures and properties (e.g., water retention properties). These transitions may provide interesting avenues for controlling the response of PEMs to changes in humidity and temperature. Because structural integrity may be maintained in these systems over a wide range of temperatures and humidities, the PEMs based on such polymers need not necessarily operate in the regime where the polymer exists in the ordered state. As long as structural integrity of the polymer is maintained, the membrane may be operated under a variety of conditions, including conditions under which the polymer is microscopically disordered or under which ODTs and DOTs occur.

These and other features and advantages of the present invention will be described in more detail below with reference to the associated drawings.

DETAILED DESCRIPTION OF PREFERRED EMBODIMENTS

I. Nanostructured Polymer Membranes

Aspects of present invention provide a new methodology for improving the proton conductivity of membranes used in polymer electrolyte fuel cells. In particular, it is shown that membranes with well-defined hydrophilic channels having a width of less than about 6 nm, e.g., in the 2.5-4.8 nm range, remain moist in a relatively dry environment (relative humidity, RH=50%) up to temperatures as high as 90° C. Without being bound by a particular theory, it is suggested that capillary condensation is important at these width scales. This retention of water leads to an increase in the overall conductivity with increasing temperature. In contrast, membranes with hydrophilic channels larger than 6 nm in many cases dry up at RH=50% and temperatures above 60° C. The morphology of the hydrated membranes is believed to play a role in water retention and, consequently, in proton conduction of membranes. This morphology was determined by a combination of in-situ neutron scattering and cryogenic electron microscopy. A quantitative relationship between hydrated morphology and proton conductivity of synthetic polymer membranes is herein described.

Figure 1:
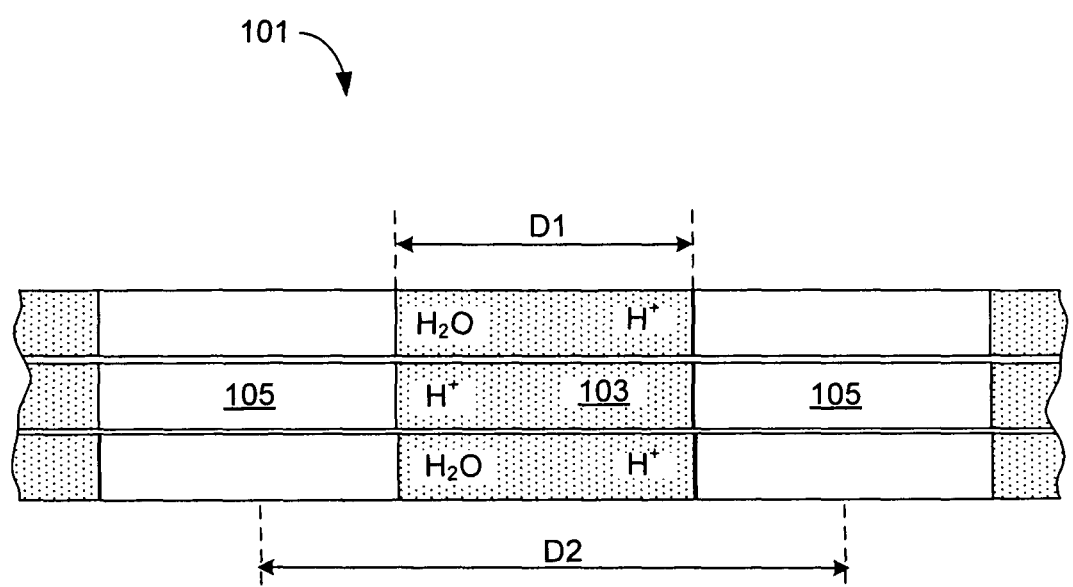
FIG. 1 is a schematic cross-sectional presentation of a nanostructured block copolymer in accordance with some embodiments presented herein.

According to one embodiment, PEMs having well-defined hydrophilic channels with widths of less than about 6 nm, preferably less than about 5 nm are provided. "Widths" as used herein refer to the most narrow dimension of the channel, and in some morphologies may refer to a diameter of the channel. FIG. 1 illustrates a schematic cross-sectional view of an example polymer nanostructure in accordance with embodiments presented herein. The polymer 101 includes hydrophilic portions 103 and structural portions 105. The hydrophilic portions 103 typically include hydrophilically functionalized polymer, e.g., a polymer substituted with hydrophilic groups such as —$SO_3H$, —COOH, —OH, etc. In a particular embodiment, a sulfonated polymer which includes —$SO_3H$ groups is employed. The structural portions (or domains) 105 may be composed of a less hydrophilic or of a hydrophobic material (e.g., of hydrophobic alkyl portions of a polymer). Examples of such hydrophobic moieties include but are not limited to unfunctionalized saturated alkyl groups and alkyl groups derivatized with hydrophobic substituents. In a particular example linear diblock copolymers comprising a hydrophilically functionalized block and a structural (e.g., hydrophobic) block are used. Examples of suitable hydrophilically functionalized block-copolymers include without limitation sulfonated polystyrene-block-polyolefins, sulfonated polysulfone-block-polyolefins, sulfonated poly(ether sulfone)-block-polyolefins, sulfonated poly(ether ketone)-block-polyolefins, sulfonated poly(ether ether ketone)-block-polyolefins, sulfonated poly(phenyl quinoxaline)-block-polyolefins, sulfonated poly(phenylene sulfide)-block-polyolefins, sulfonated polyimide-block-polyolefins, and perfluorosulfonic acid-block-fluorinated polyolefins.

As illustrated in FIG. 1, hydrophilic domains 103 arrange themselves such that hydrophilic channels are formed within the matrix of structural domains 105. The hydrophilic channels are characterized by their width (or their most narrow dimension) D1. The membranes are also characterized by their domain spacing D2, defined as a distance between the half-width points of structural domains 105 separated by a hydrophilic channel. The hydrophilic channels serve as the proton-conductive pathways within the membrane. In order to provide proton conductivity, the channels need not necessarily be linear, but may have a variety of shapes and geometries. When water is entrained within the hydrophilic proton-conductive channels, e.g., from atmosphere or upon soaking the membrane in water, facile proton conduction occurs. When membranes lose water, e.g., at high temperature and at low humidity, lower proton conductivities are observed.

Improved water retention values and high proton conductivities, particularly at high temperatures and at low humidities are observed when the width of hydrophilic channels D1 is less than about 6 nm, preferably less than about 5 nm, and even more preferably less than about 3 nm (e.g., about 2.5 nm). While the invention is not limited by any particular theory of operation, it is believed that at this scale, due to capillary condensation, water can be retained within the hydrophilic channels at temperatures greater than about 80° C. and even greater than about 90° C. The term "about", as used in this application, is defined as a range including ±5% of a value to which it applies, except when the value is temperature. With reference to temperature, the term "about", as used herein, refers to a range within 5° C. of the temperature value to which it applies.

As noted above, in some cases, polymers having hydrophilic channels of this scale entrain larger amounts of water at higher temperatures than at lower temperatures. For example, certain polymers described herein entrain larger amounts of water at 90° C. than at 80° C. at constant humidity and in the absence of any special treatment.

In certain embodiments, block copolymers forming ordered nanostructures are provided. Due to self-assembly of hydrophobic and hydrophilic domains, block copolymers can form structures with periodically repeating hydrophobic and hydrophilic portions. The presence of such order, particularly in a hydrated state, is believed to contribute to improved water retention and proton conductivity. A variety of ordered nanostructures can form, which include lamellar (LAM), gyroid, hexagonally perforated lamellar (HPL), and hexagonal cylindrical (HEX) structures. These structures are well known to those skilled in the art of polymer science, and will not be described in detail. In specific examples, gyroid and lamellar nanostructures were found to be present in polymers with particularly good water retention properties.

Certain aspects of the invention will be illustrated with the reference to PSS-b-PMB diblock copolymer. It is understood that principles described herein can be applied to other PEM materials. Given the general directions provided herein, one of skill in the art will understand how to optimize polymer synthesis such that polymers with hydrophilic nanochannels of less than about 6 nm are formed. One would also understand how to make block copolymers with ordered nanostructure.

Figure 2:
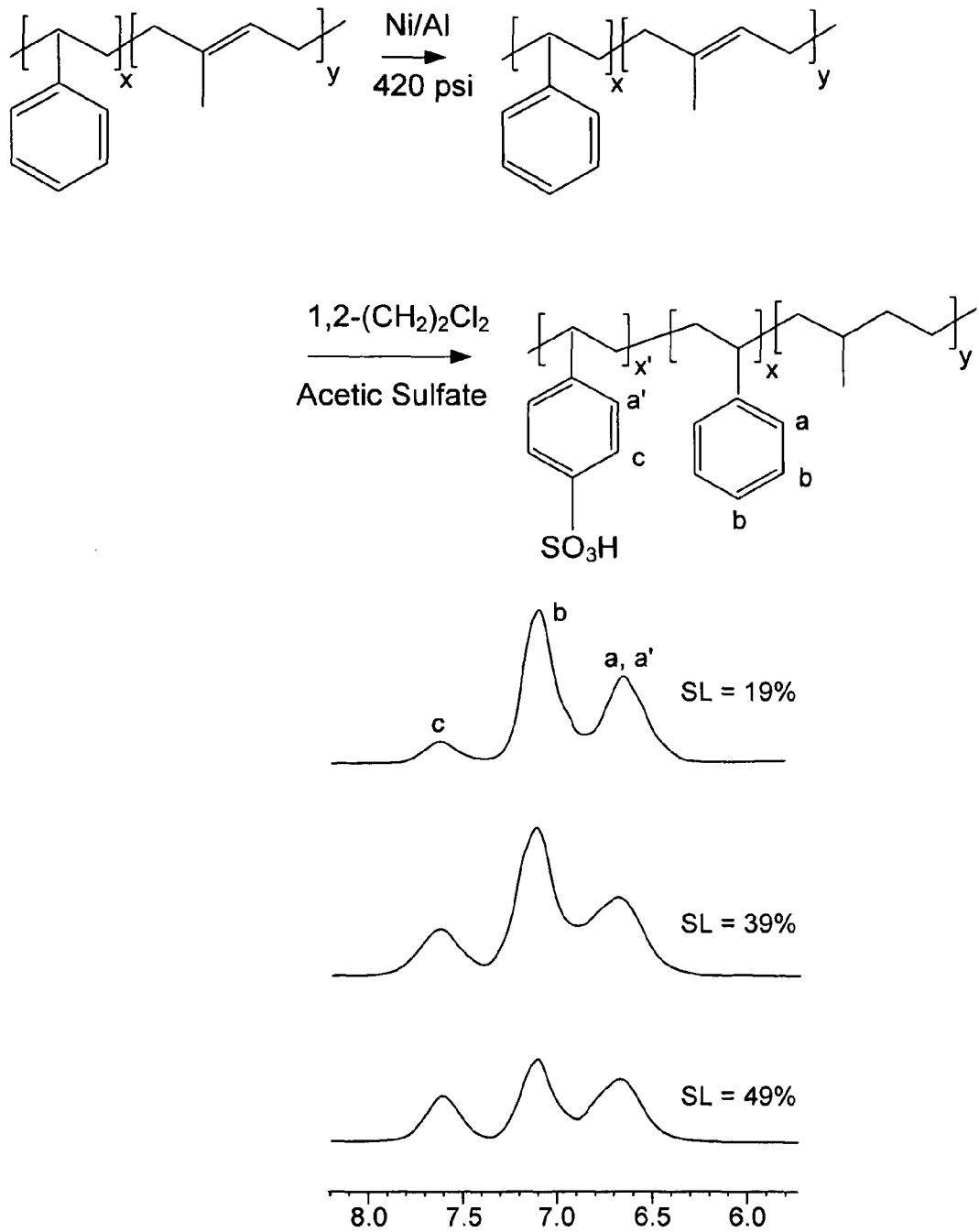
FIG. 2 illustrates an example synthetic scheme for preparation of PSS-b-PMB and $^1$H NMR spectra of the P9 series of copolymers with different sulfonation levels (SL).

In a specific embodiment, PSS-b-PMB is used as a membrane material. An example PSS-b-PMB synthesis and $^1$H NMR spectra for synthesized materials with different sulfonation levels are shown in FIG. 2. The starting material, polystyrene-b-polyisoprene (PS-b-PI) diblock copolymer is synthesized by standard anionic polymerization from styrene and isoprene. The molecular weight of the formed copolymer is controlled by controlling the initiator-to-monomer ratio (e.g., sec-butyl lithium-to-styrene ratio), with larger ratios leading to lower molecular weight copolymers. Control over molecular weight is important in the present application, because molecular weight correlates with the size of hydrophilic channels in the PSS-b-PMB polymer, with lower molecular weight polymers having smaller hydrophilic channels. In the case of PSS-b-PMB, it was found that block-copolymers with molecular weights of less than about 8,500 g/mol afforded structures with hydrophilic channel widths of less than about 6 nm. Specifically, co-polymers with molecular weights of less than about 5,000 g/mol and even less than about 3,400 g/mol were forming structures with hydrophilic channels in the desired size range. Referring again to FIG. 2, the synthesis proceeds with hydrogenation of PS-b-PI starting material using Ni/Al catalyst under $H_2$ pressure of 420 psi. The isoprene unit is selectively hydrogenated, with the aromatic ring remaining intact, producing polystyrene-b-polymethylbutylene (PS-b-PMB). The synthesis concludes by partially sulfonating aryl groups of the PS-b-PMB copolymer to afford PSS-b-PMB. Sulfonation levels of between about 15-60%, preferably between about 20-55% were found to be optimal for the described PSS-b-PMB polymers, wherein sulfonation levels refer to the fraction of sulfonated aryl groups in the PSS-b-PMB copolymer. High sulfonation levels are preferred, because they generally provide higher ion exchange capacity (IEC) values and correlate with higher proton conductivities. However, at very high sulfonation levels the polymer may dissolve when hydrated, therefore being unsuitable as a membrane. Thus, sulfonation levels are adjusted to achieve both structural integrity of the membrane and good proton conductivity. Proton NMR spectra for PSS-b-PMB polymers having SLs of 19%, 39%, and 49% are shown in FIG. 2.

A number of PSS-b-PMB block copolymer samples were prepared and their morphology and proton conduction properties were studied. Table 1 provides molecular weights for PSS and PMB blocks of copolymers, sulfonation levels, morphologies in dry state, domain spacing (D2), ion exchange capacities, and water uptake percentage by weight. Table 2 provides volume fractions of hydrophilic channels within the structure (corresponding to volume fraction of hydrophilic block of the copolymer), molecular weights of the copolymers, hydrophilic channel widths D1, proton conductivities ($\sigma$) at room temperature and at RH of 98%, proton conductivities ($\sigma$) at 90° C. and at RH of 98%, and proton conductivities ($\sigma$) at 90° C. and at RH of 50%. For example, sample P1(1.582) is a PSS-b-PMB diblock copolymer, having molecular weight of about 3,200 g/mol, where molecular weight of PSS and PMB blocks is about 1,800 g/mol and about 1,400 g/mol respectively, the number of monomers in the hydrophilic block (stryrene and sulfonated styrene) is 14, the number of monomers in the hydrophobic block (methylbutylene) is 20, the sulfonation level is about 32.1%, ion exchange capacity is 1.582 mmol/g, and the volume fraction of hydrophilic channel is about 0.481. This sample forms an ordered nanostructure having gyroid morphology in a dry state. The structure is characterized by domain spacing of about 5.15 nm, and a width of hydrophilic channel of about 2.5 nm. This block copolymer sample exhibits water uptake of about 69.8 weight % and achieves proton conductivities of 0.1233 S/cm at room temperature and 98% RH, 0.1883 S/cm at 90° C. and 98% RH, and 0.0413 S/cm at 90° C. and 50% RH.

TABLE 1

Properties of PSS-b-PMB copolymers used in present study

| Sample Code | Molecular Weight (PSS-PMB) (g/mol) | SL (%) | Morphology | Domain Spacing (nm) | IEC (mmol/g) | Water Uptake (wt %) |
|---|---|---|---|---|---|---|
| P1(0.877) | 1.5K-1.4K | 17.8 | Disorder | 4.67 | 0.877 | 26.2 |
| P1(1.513) | 1.7K-1.4K | 30.7 | Disorder | 4.80 | 1.513 | 62.8 |
| P1(1.582) | 1.8K-1.4K | 32.1 | Gyroid | 5.15 | 1.582 | 69.8 |
| P1(2.168) | 2.0K-1.4K | 44.0 | Gyroid | 5.16 | 2.168 | 81.6 |
| P3(0.950) | 3.0K-2.6K | 18.9 | LAM | 7.28 | 0.950 | 27.1 |
| P3(1.005) | 3.1K-2.6K | 20.9 | LAM | 7.53 | 1.005 | 33.2 |
| P3(1.608) | 3.5K-2.6K | 31.9 | HPL | 8.08 | 1.608 | 58.4 |
| P3(2.226) | 3.6K-2.6K | 44.3 | HPL | 8.28 | 2.226 | 77.1 |
| P4(0.845) | 4.0K-3.7K | 17.4 | LAM | 9.05 | 0.845 | 29.1 |
| P4(1.073) | 4.1K-3.7K | 22.1 | Gyroid | 9.52 | 1.073 | 36.9 |
| P4(1.860) | 4.6K-3.7K | 38.3 | HPL | 10.12 | 1.860 | 66.4 |
| P4(2.118) | 4.8K-3.7K | 44.7 | HPL | 10.86 | 2.118 | 72.5 |
| P5(0.341) | 5.1K-4.6K | 6.7 | LAM | 11.94 | 0.341 | 7.8 |
| P5(1.053) | 5.6K-4.6K | 20.7 | LAM + HPL | 12.35 + 13.98 | 1.053 | 19.2 |
| P5(2.015) | 6.4K-4.6K | 39.6 | HPL | 14.13 | 2.015 | 52.5 |
| P5(2.392) | 6.9K-4.6K | 47 | HEX | 15.27 | 2.392 | 55.1 |
| P5(2.692) | 7.1K-4.6K | 52.9 | HEX | 14.68 | 2.692 | 82.1 |
| P9(0.943) | 10.6K-8.7K | 18.5 | LAM + HPL | 19.8 + 21.73 | 0.943 | 14.8 |
| P9(1.973) | 12.1K-8.7K | 38.7 | HEX | 22.53 | 1.973 | 48.7 |
| P9(2.478) | 12.8K-8.7K | 48.6 | HEX | 22.88 | 2.478 | 60.2 |
| P9(2.717) | 13.2K-8.7K | 53.3 | HEX | 23.05 | 2.717 | 78.1 |
| P48(0.879) | 52.8K-55.0K | 18.7 | LAM + HPL | 74.9 + 78.0 | 0.879 | 13.0 |
| P48(1.473) | 55.0K-55.0K | 31.3 | HEX | 78.3 | 1.473 | 34.4 |
| P48(2.490) | 61.0K-55.0K | 52.9 | HEX | 78.6 | 2.490 | 55.6 |
| P48(2.647) | 61.6K-55.0K | 56.2 | HEX | 78.7 | 2.647 | 74.9 |

TABLE 2

Properties of PSS-b-PMB copolymers used in present study

| Sample Code | Volume fraction of hydrophilic channel | $M_n$ (PSS-b-PMB) (g/mol) | N(S + SS)-N(MB) | D1 (nm) | Proton $\sigma$ at RH = 98% RT (S/cm) | Proton $\sigma$ at RH = 98% 90° C. (S/cm) | Proton $\sigma$ at RH = 50% 90° C. (S/cm) |
|---|---|---|---|---|---|---|---|
| P1(0.877) | 0.473 | 2900 | 14-20 | — | — | — | — |
| P1(1.513) | 0.480 | 3100 | 14-20 | — | — | — | — |
| P1(1.582) | 0.481 | 3200 | 14-20 | 2.5 | 0.1233 | 0.1883 | 0.0413 |
| P1(2.168) | 0.488 | 3400 | 14-20 | 2.6 | 0.1413 | 0.2124 | 0.0460 |
| P3(0.950) | 0.464 | 5600 | 25-37 | 3.6 | 0.0308 | 0.0533 | — |
| P3(1.005) | 0.465 | 5700 | 25-37 | 3.7 | 0.0464 | 0.0798 | 0.0175 |
| P3(1.608) | 0.471 | 6100 | 25-37 | 4.0 | 0.0840 | 0.1427 | 0.0299 |

TABLE 2-continued

Properties of PSS-b-PMB copolymers used in present study

| Sample Code | Volume fraction of hydrophilic channel | $M_r$ (PSS-b-PMB) (g/mol) | N(S + SS)-N(MB) | D1 (nm) | Proton σ at RH = 98% RT (S/cm) | Proton σ at RH = 98% 90° C. (S/cm) | Proton σ at RH = 50% 90° C. (S/cm) |
|---|---|---|---|---|---|---|---|
| P3(2.226) | 0.478 | 6200 | 25-37 | 4.1 | 0.1272 | 0.2159 | 0.0451 |
| P4(0.845) | 0.459 | 7700 | 35-53 | 4.5 | 0.0302 | 0.0522 | — |
| P4(1.073) | 0.461 | 7800 | 35-53 | 4.8 | 0.0501 | 0.0860 | 0.0172 |
| P4(1.860) | 0.471 | 8300 | 35-53 | 5.0 | 0.1050 | 0.1783 | 0.0349 |
| P4(2.118) | 0.474 | 8500 | 35-53 | 5.4 | 0.1145 | 0.1943 | 0.0380 |
| P5(0.341) | 0.477 | 9700 | 48-67 | 6.0 | — | — | — |
| P5(1.053) | 0.485 | 10200 | 48-67 | 6.2 + 7.0 | 0.0385 | 0.0307 | — |
| P5(2.015) | 0.496 | 11000 | 48-67 | 7.1 | 0.0766 | 0.0590 | 0.0201 |
| P5(2.392) | 0.500 | 11500 | 48-67 | 7.3 | 0.0821 | 0.0622 | 0.0221 |
| P5(2.692) | 0.503 | 11700 | 48-67 | 7.7 | 0.1075 | 0.0803 | 0.0243 |
| P9(0.943) | 0.484 | 19300 | 91-125 | 9.8 + 10.9 | 0.0234 | 0.0158 | — |
| P9(1.973) | 0.496 | 20800 | 91-125 | 11.2 | 0.0812 | 0.0544 | 0.0143 |
| P9(2.478) | 0.501 | 21500 | 91-125 | 11.4 | 0.0953 | 0.0638 | 0.0165 |
| P9(2.717) | 0.504 | 21900 | 91-125 | 11.5 | 0.1126 | 0.0752 | 0.0191 |
| P48(0.879) | 0.440 | 107800 | 480-786 | 37.4 + 39.0 | 0.0105 | — | — |
| P48(1.473) | 0.447 | 110000 | 480-786 | 39.1 | 0.0508 | 0.0479 | — |
| P48(2.490) | 0.458 | 116000 | 480-786 | 39.3 | 0.0784 | 0.0724 | 0.0145 |
| P48(2.647) | 0.460 | 116600 | 480-786 | 39.4 | 0.0986 | 0.0905 | 0.0178 |

The molecular weight of copolymers varied from 2,900 to 116,600 g/mol. The characteristic size (width) of the hydrophilic channels (D1) in the dry state was varied from 2.5 to 39.0 nm. The morphology of the hydrated membranes was determined by a combination of in-situ small angle neutron scattering (SANS) under controlled humidity and cryogenic transmission electron microscopy (cryo-TEM). It was demonstrated that there is no loss of order upon hydration. Experiments described herein enable the determination of the effect of channel geometry on water retention and proton conduction.

Figure 3A:
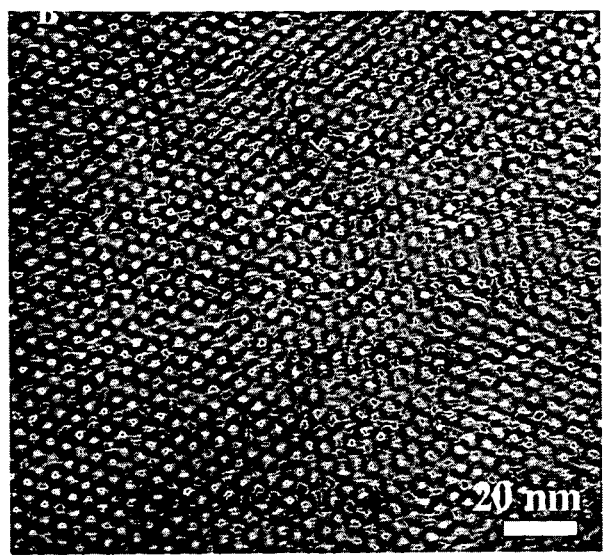
FIG. 3A shows a cross-sectional TEM image of P1(1.582) in dry state (301). PSS domains appear dark due to $RuO_4$ staining.
Figure 3B:
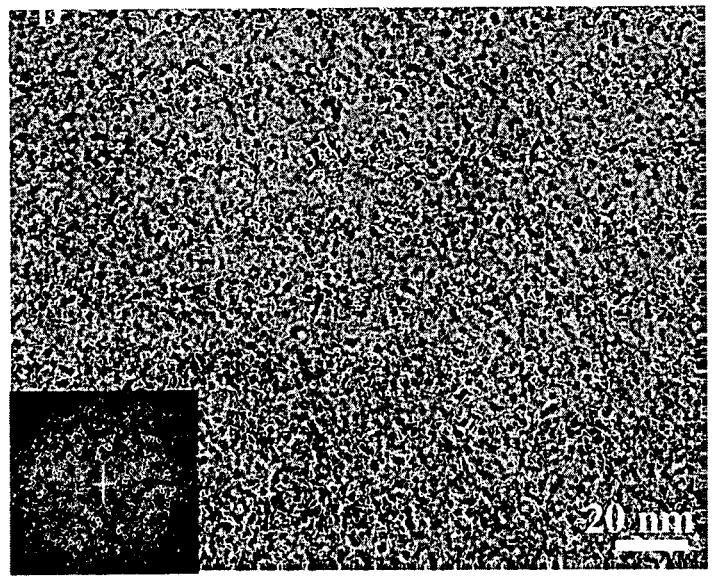
FIG. 3B is a cryo-TEM image and FFT inset of hydrated sample for unstained P1(1.582).

In FIG. 3A, the micrograph 301 shows TEM data obtained on sample P1(1.582) in the dry state. These data clearly indicate the presence of a gyroid morphology in this sample. The presence of gyroid morphology was also confirmed by synchrotron small angle X-ray scattering (SAXS) (shown in FIG. 9 and discussed in the Experimental Details section). When sample P1(1.582) is exposed to $D_2O$/air environment its morphology changes to a lamellar nanostructure, which was determined by time-dependent SANS (not shown) and was also confirmed by cryo-TEM data for a sample soaked in $H_2O$. In FIG. 3B, micrograph 303 represents cryo-TEM images of an ultrathin (80 nm) specimen of P1(1.582) soaked in $H_2O$ which confirm the presence of a lamellar phase with domain spacing of 6.5 nm. It is important to note that the TEM image 303 is obtained without staining. Since the electron density of the hydrophilic domains (PSS+water) is higher than that of the hydrophobic domains (PMB), the dark regions in 303 represent the water-rich domains. The image 303 represents what is believed to be the first electron micrograph of undoped hydrated channels in any PEM.

Figure 4A:
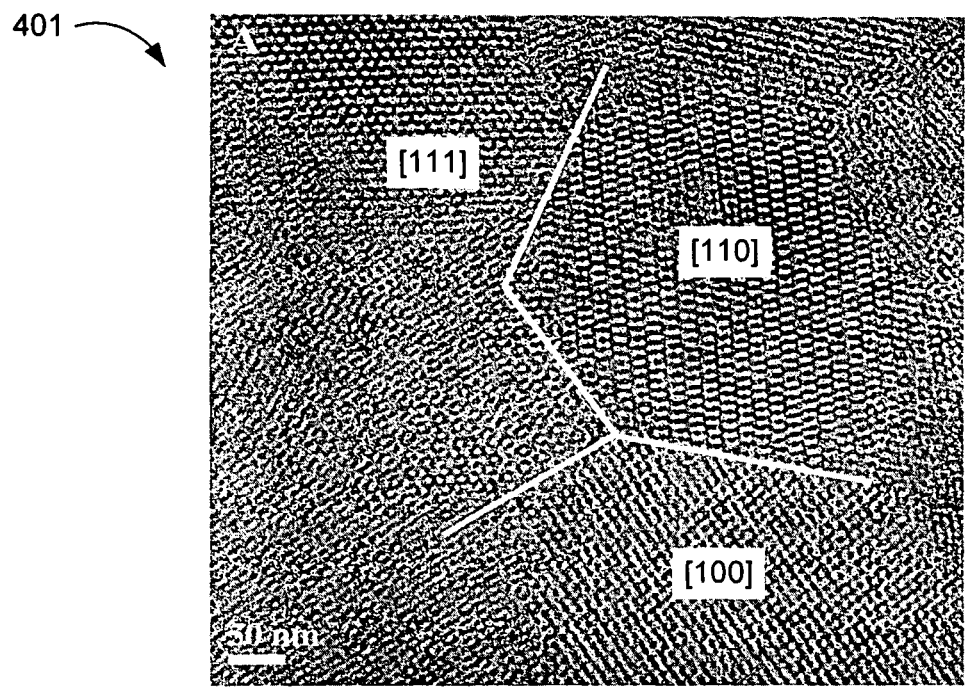
FIG. 4A shows a TEM image 401 of dry P4(1.073) with gyroid projections characteristic of 3 different grain orientations having 4-fold ([100]), 3-fold ([111]). and 2-fold [(110)] morphologies. PSS domains appear dark due to $RuO_4$ staining.
Figure 4B:
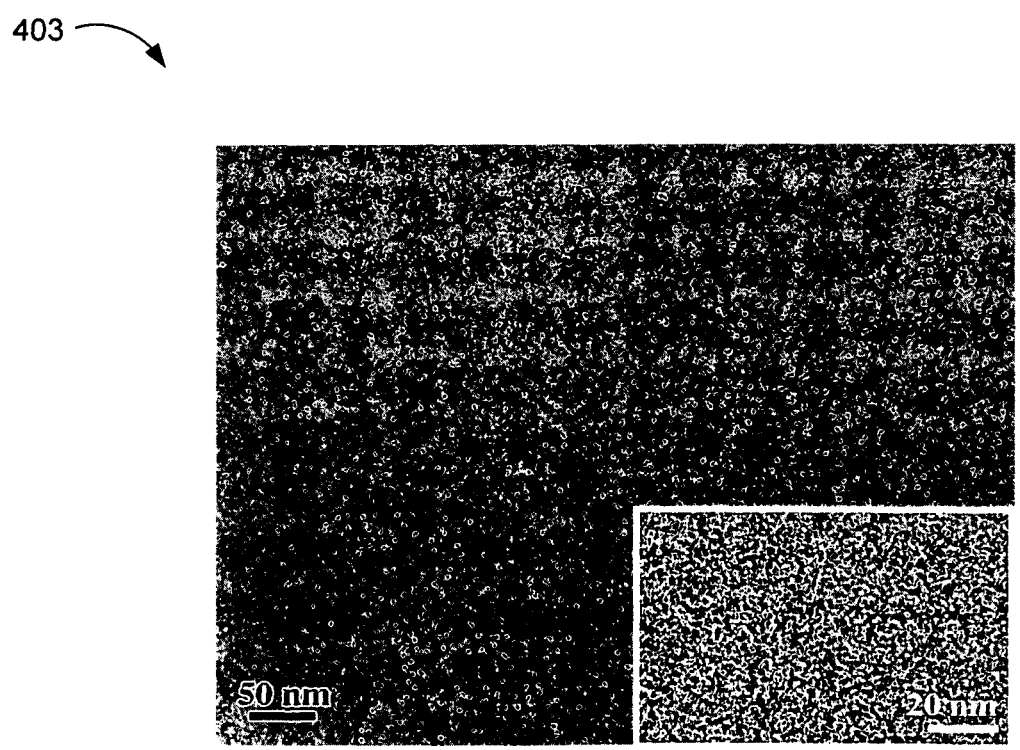
FIG. 4B is a cryo-TEM image (403) of unstained hydrated P4(1.073) sample showing the (111) plane. The inset box in 403 shows the image obtained with higher magnification.

In FIGS. 4A and 4B, TEM illustrates gyroid phases with 9.5 nm domain spacing obtained from both dry (TEM 401, FIG. 4A) and wet (TEM 403, FIG. 4B) versions of P4(1.073). Contrary to the case of the P1(1.582), both the gyroid morphology and domain spacing of P4(1.073) containing lower number of ionic sites are maintained upon hydration. TEM 403 shows the hydrated gyroid structure which has a honeycomb-like appearance and periodicity that matches that seen along the [111] projection in the dry state (TEM 401). The formation of the gyroid phase in the hydrated state is important because it is believed that network phases may be best suited for ion transport.

As it will be illustrated, the water uptake and proton conduction properties of obtained samples markedly differ between the group of copolymers having narrow hydrophilic channels (with D1 of less than about 6 nm) and the group of copolymers with wider channels (D1 of at least about 6 nm). Samples from P1, P3, and P4 series fall within the first group, which is referred to as low molecular weight group, characterized by molecular weight of less than about 9,000 g/mol, e.g. 8,500 g/mol and lower. P5, P9, and P48 samples fall within the second group, which is referred to as high molecular weight group characterized by molecular weights of at least about 9,000 g/mol, e.g., 9,700 and higher. While block copolymers having high molecular weights and larger hydrophilic channels exhibit adequate proton conductivities for some PEM applications, the low molecular weight polymers having narrow hydrophilic channels are particularly advantageous due to their unusual water retention properties and improved proton conduction.

Figure 5A:
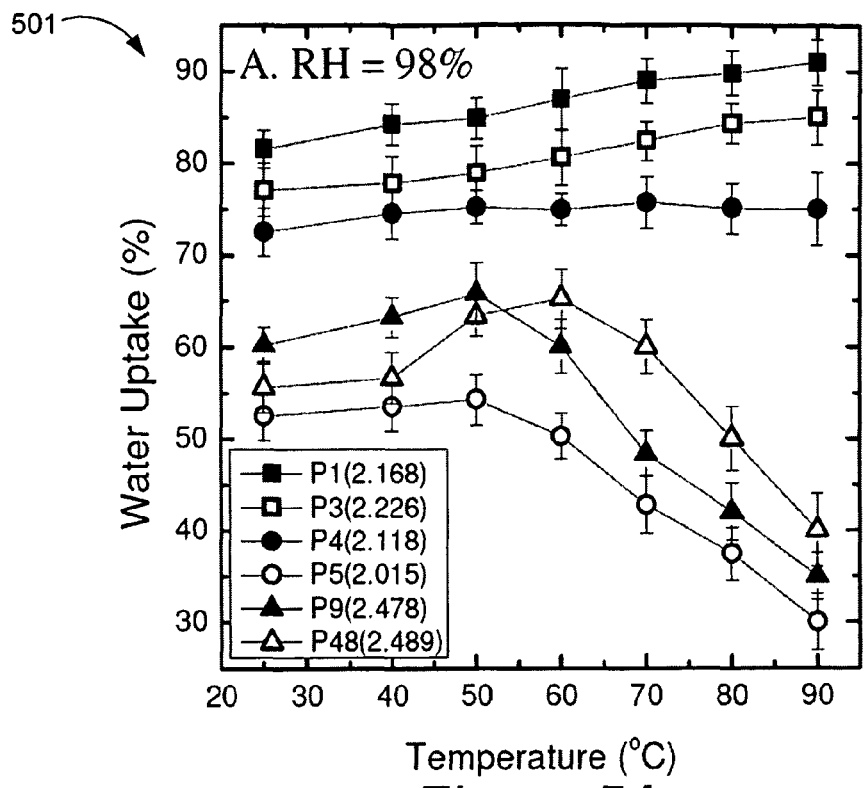
FIG. 5A presents water uptake results as a function of temperature at fixed IEC values at RH=98% (501).
Figure 5B:
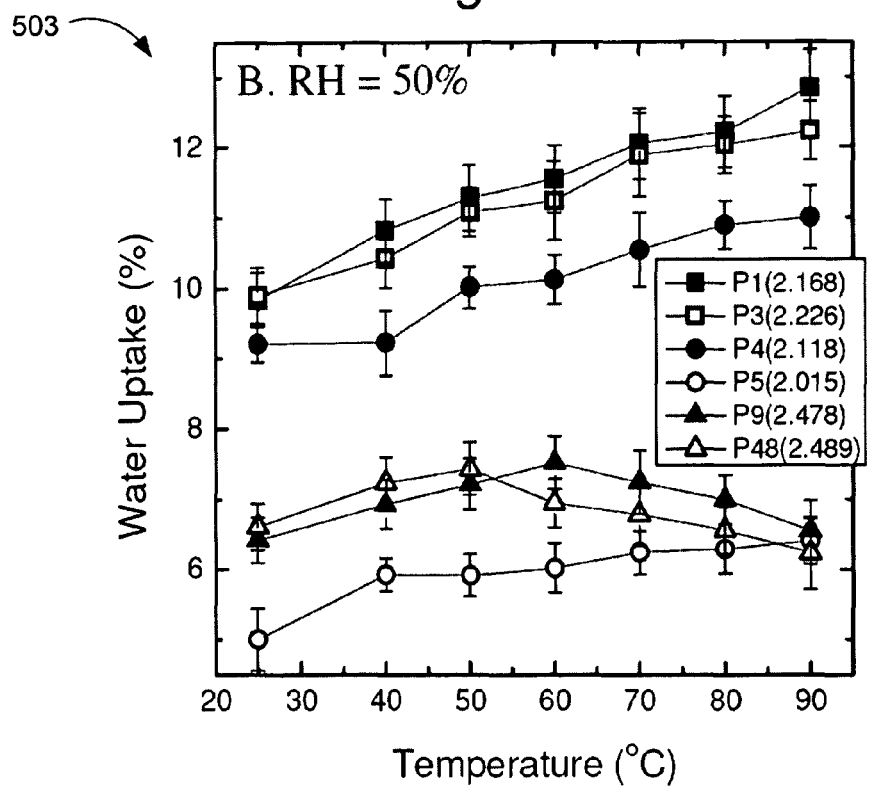
FIG. 5B presents water uptake results as a function of temperature at fixed IEC values at RH=50% (503).

FIGS. 5A and 5B provide the temperature dependence of water uptake for membranes characterized in Tables 1 and 2, at a fixed IEC value of 2.25±0.24. The plots 501 (FIG. 5A) and 503 (FIG. 5B) provide temperature dependence at 98% RH, and 50% RH respectively. The qualitative difference between the low molecular weight group and the high molecular group is clear. The water uptake of membranes made from the high molecular weight polymers decreases significantly at temperatures above 50° C. In contrast, the water uptake of the low molecular weight samples is not affected by temperature up to temperatures as high as 90° C. Surprisingly, it was observed that in some low molecular weight samples, water uptake is increased with the increase of temperature. For example, for sample P1(2.168) having hydrophilic channel width of 2.6 nm, water uptake increases from about 80% wt. to about 90% wt. as the temperature is increased from 25° C. to 90° C. at 98% RH. This sample exhibits similar behavior at a low humidity. As it can be seen from the plot 503, water uptake for this sample increases from about 10% wt. to about 12% wt. as the temperature increases from 25° C. to 90° C. at 98% RH.

Figure 6A:
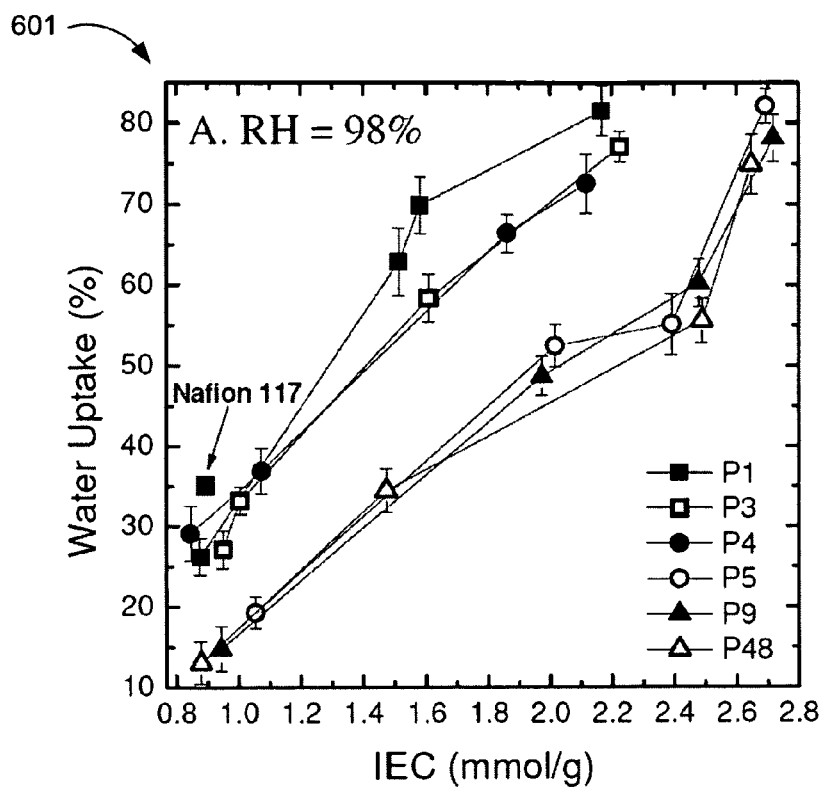
FIG. 6A presents water uptake results as a function of IEC values at fixed temperature at RH=98% (601).
Figure 6B:
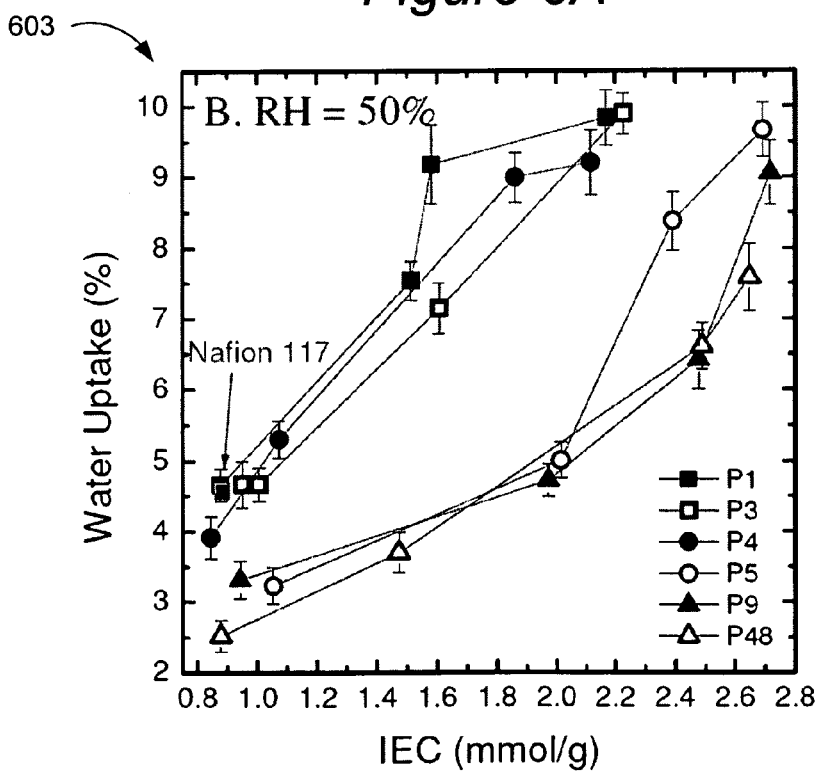
FIG. 6B presents water uptake results as a function of IEC values at fixed temperature at RH=50% (603).

In another experiment, water uptake of 50 μm thick films of PSS-b-PMB copolymers was measured as a function of ion exchange capacity (IEC) at different RH. Only samples that maintained their mechanical integrity in the hydrated state were studied. In FIGS. 6A-6B, plots of water uptake versus membrane IEC at room temperature are provided for 98% RH (plot 601, FIG. 6A) and for 50% RH (plot 603, FIG. 6B). It is evident that the water uptake characteristics of the membranes at a given IEC value are not smooth functions of block copolymer molecular weight. Instead the data is divided into two groups. The water uptake of the P5, P9, and P48 series is significantly lower than that of P1, P3, and P4 at all IEC values. In other words, there is a discontinuous increase in water content when the size of the hydrophilic channels is reduced from 6 to 5 nm, and relatively little change when the channel size is below 5 nm or above 6 nm. It is noted that previous publications suggesting that the hydrophilic channel size does not affect proton transport are restricted to samples with channels significantly larger than 6 nm.

Figure 6C:
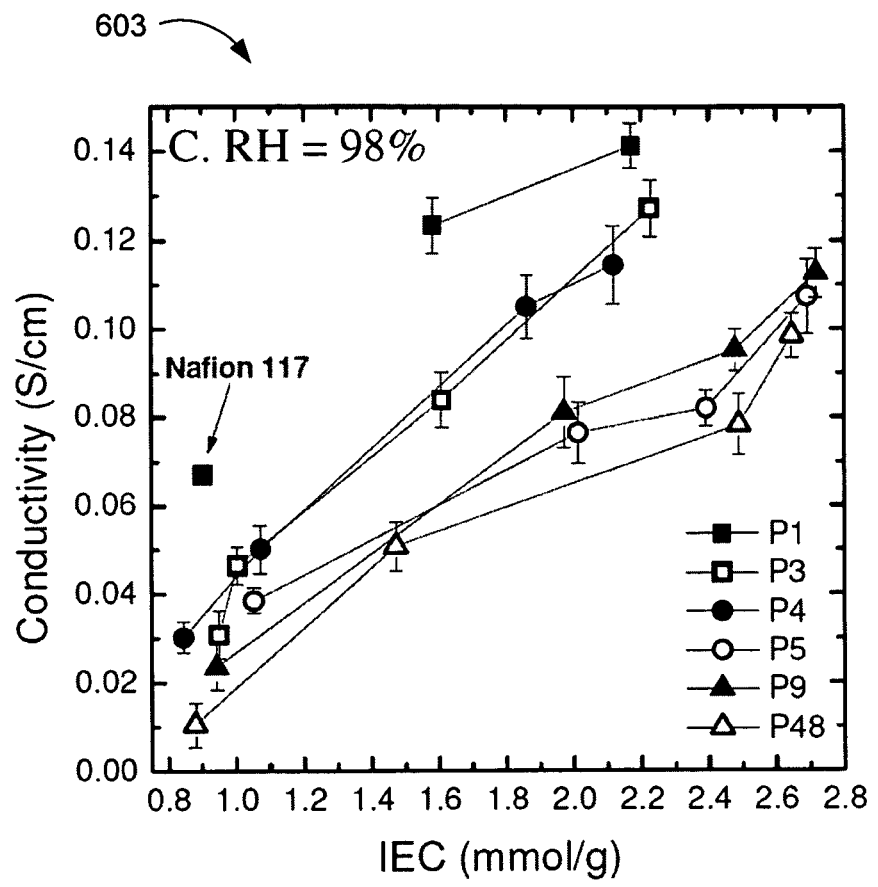
FIG. 6C presents proton conductivity results as a function of IEC values at RH=98% and 25° C. (605).

Proton conductivity of PSS-b-PMB membranes at room temperature was measured as a function of IEC as shown in plot 603 of FIG. 6C. Excellent correspondence between water uptake (plot 601, FIG. 6A) and conductivity (plot 603, FIG. 6C) with qualitative differences between the low molecular weight group and the high molecular weight group, was observed. It is evident that the significantly enhanced water retention seen in membranes made from the low molecular weight group leads to an increase in the overall proton transport rates. The room temperature proton conductivity of the present membranes is comparable to that of conventionally used NAFION® 117.

Figure 7A:
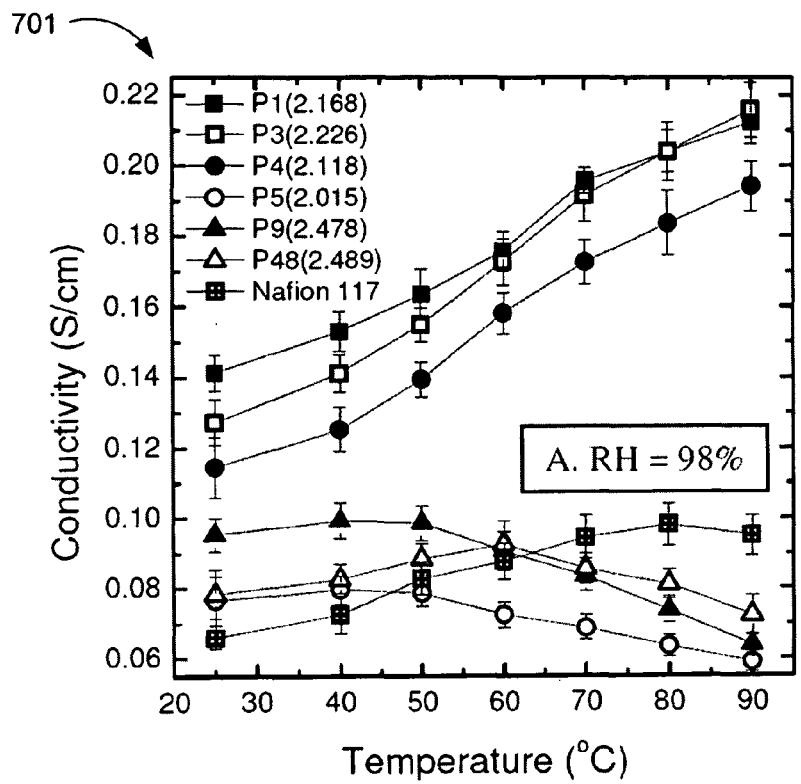
FIG. 7A presents proton conductivity results as a function of temperature at fixed IEC values at RH=98% (701).
Figure 7B:
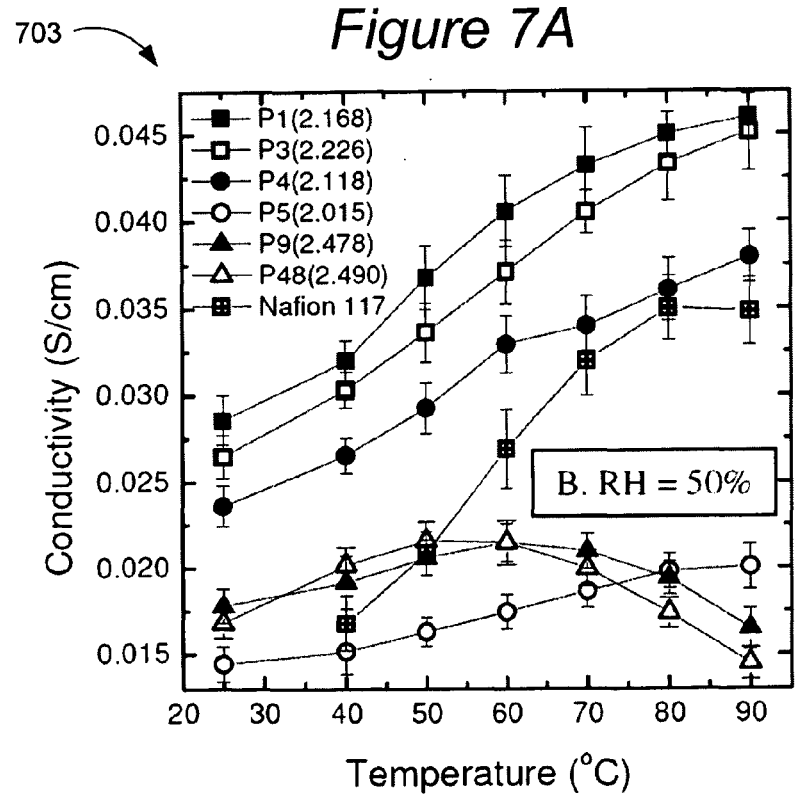
FIG. 7B presents proton conductivity results as a function of temperature at fixed IEC values at RH=50% (703).

Proton conductivity of the membranes as a function of temperature at a fixed IEC value of 2.25±0.24 is shown in FIGS. 7A-7B. Plot 701 (RH=98%) shown in FIG. 7A and plot 703 (RH=50%) shown in FIG. 7B provide conductivity data at different humidity levels. Proton conductivity of membranes made from the high molecular weight group decreases with increasing temperature when the 50° C. threshold is crossed. It is evident in 701 that the magnitude of the conductivity of NAFION® 117 is similar to that of the high molecular weight samples. In contrast, proton conductivity obtained from membranes made from the low molecular group increases significantly with increasing temperature up to temperatures as high as 90° C. For example, P1(2.168) under 98% RH shows increases in proton conductivity from 0.141 to 0.212 S/cm when the temperature is raised from 25 to 90° C. The correspondence between water uptake and conductivity noted above is also seen in the temperature-dependent studies at a fixed IEC value, as shown above.

As it can be seen from the plot 701, conductivities of greater than about 0.1 S/cm are observed in the low molecular weight group. Specifically, at temperatures greater than about 60° C. (e.g., greater than about 80° C.), conductivities of greater than about 0.15 S/cm are seen. For example, at a temperature of about 90° C. conductivities reach about 0.2 S/cm.

For practical applications, the properties of membranes at low humidity are important. This is addressed in plot 703 in FIG. 7B showing the temperature-dependent conductivity of copolymer membranes with IEC=2.25±0.24 at RH=50%. A remarkable increase in conductivity with temperature up to 90° C. in the low molecular weight group, is observed. It is evident that the conductivity of PEMs provided herein under dry conditions is significantly affected by the hydrophilic channel size. In particular, channels with a width of 2.5 nm exhibit the highest proton conductivity at 50% humidity. The conductivity of NAFION® 117 is similar to the high molecular weight group at low temperatures, and the low molecular weight group at high temperatures.

It can be seen that at low humidity, proton conductivities of at least about 0.02 S/cm are observed for the low molecular weight group over a large range of temperatures of 25-90° C. At high temperatures (e.g., greater than 80° C.) and at 50% RH, conductivities of at least about 0.03 S/cm are observed for some low molecular weight samples. For example at about 90° C. conductivities of at least about 0.037 S/cm, e.g., about 0.046 are observed. These conductivity values are significantly higher than conductivities observed at high temperature and low humidity for conventionally used membrane materials such as NAFION®. Further the obtained conductivity values remain without change over periods of at least about 48 hours, in contrast to conductivities of many conventional membranes which are often unstable at high temperatures and low humidity conditions.

Figure 7C:
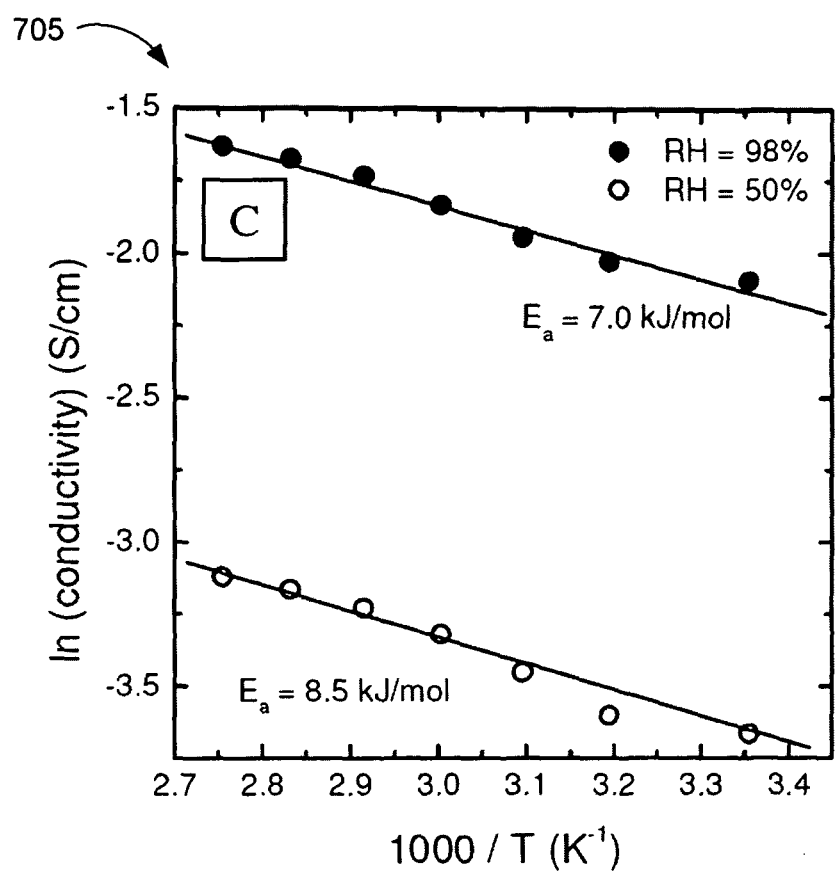
FIG. 7C presents Arrhenius plots of P1(1.582) at RH=98% and RH=50%. The activation energy for proton transport ($E_a$) was calculated from the slope of the linear fits through the data.

The activation energy for proton conduction calculated from Arrhenius plots for the P1(1.582) membrane are 7.0 (RH=98%) and 8.5 (RH=50%) kJ/mol, as shown in plot 705 of FIG. 7C, which is similar to that obtained for a solution of a strong acid such as $H_2SO_4$ in water. It is evident that the activation barriers for proton conduction in the P1(1.582) membrane at RH=50% are similar in magnitude to those for proton transport in bulk water. This implies that there is no change in the accessibility of the hydrophilic pores in the noted membranes as the channel size is reduced down to 2.5 nm.

Figure 8:
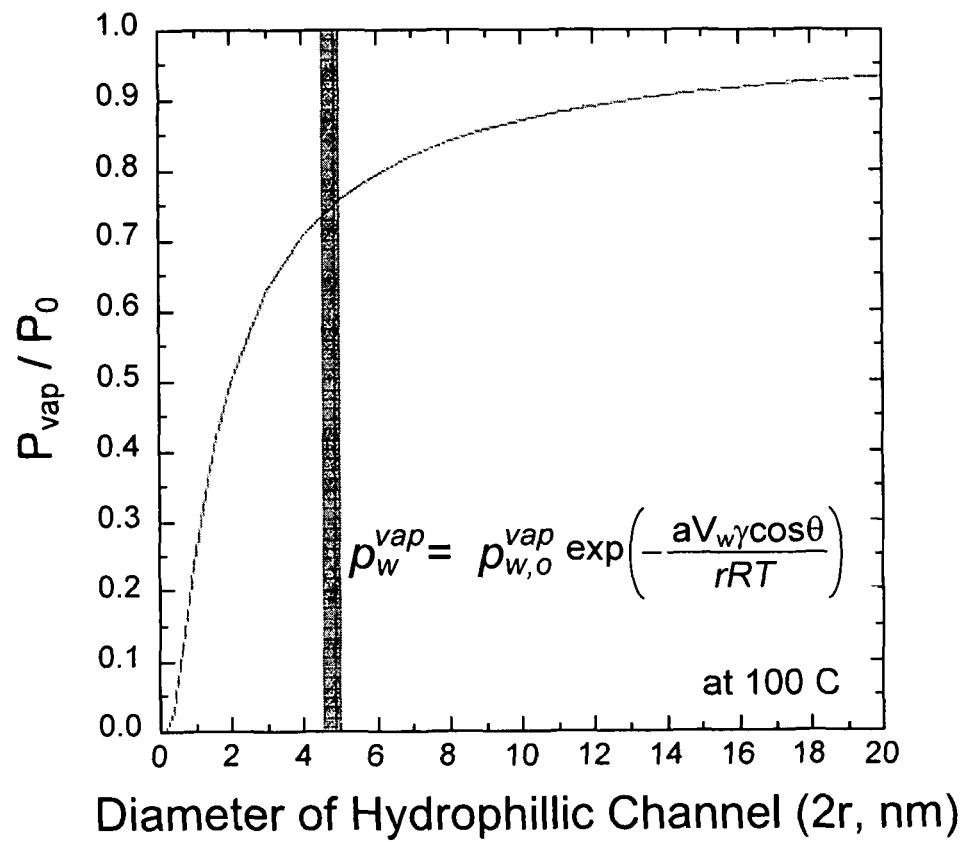
FIG. 8 presents a calculated plot illustrating the capillary condensation effect as a function of diameter of a hydrophilic channel.

The phenomenon of capillary condensation provides an explanation for the observation that the water retention properties and proton conduction properties of provided membranes change dramatically when the size of the channels approaches 5 nm. The confinement of fluids within nanoscale channels leads to a reduction in chemical potential due to curvature-related (i.e., meniscus) effects. A measure of the decrease in chemical potential is the elevation of the boiling point of a fluid under confinement. Using the Kelvin and Young-Laplace equations, the vapor pressure of water corrected for the pore size effects, $p_w^{vap}$, is given by equation 3

$$p_w^{vap} = p_{w,o}^{vap} \exp\left(-\frac{aV_w\gamma\cos\theta}{rRT}\right) \quad (3)$$

where $p_{w,o}^{vap}$ is the normal vapor pressure of water, $\gamma$ is the surface tension of water, R is the ideal-gas constant, T is the absolute temperature, $V_w$ is the molar volume of water, $\theta$ is the contact angle between water and the pore surface, r is the pore radius, and constant $\alpha$ depends on pore geometry (1 and 2 for lamellae and cylinders, respectively). FIG. 8 illustrates this relationship as a plot of $p_w^{vap}/p_{w,o}^{vap}$ versus the channel diameter. Solving the above temperature-implicit equation for ambient pressure and assuming perfect wetting ($\theta$=0), leads to the conclusion that significant changes in water retention properties are expected when the channel size is in the vicinity of 5 nm. For example, a lamellar channel with a width of 2.5 nm would increase the boiling point of water by 8° C. In the systems described herein, the channel is filled with a mixture of hydrophobic and hydrophilic moieties ($\theta$>0) and thus quantitative comparisons between theoretical predictions and experiments are not possible at this stage. While capillary condensation provides a qualitative explanation for the characteristic length scale where increased water retention is expected, it does not provide an explanation for many of the quantitative observations such as the discontinuous change in water retention with channel size. The development of improved theories that account for effects such as the interactions between the hydrophilic block and water may address these issues. It is understood that the described theory of capillary condensation provides one possible explanation of the observed effect of hydrophilic pore size on proton conductivity but does not restrict or limit aspects of the invention in any way.

It is further noted that while the experimentally obtained data was limited by 90° C. as the highest available temperature, this limitation is not due to physical incapacity of the provided polymers to retain water or provide proton conduction at higher temperatures, but is merely a limitation of instruments used for measurements. Potentially, provided PEMs can be used at temperatures greater than about 90° C., and even greater than about 100° C. It is noted that water retention might be possible within the membranes having narrow hydrophilic channels at temperatures greater than the boiling point of water at atmospheric pressure, because the capillary condensation effect increases the effective boiling point of water by decreasing the local vapor pressure within the channels.

Experimental Details I

The following experimental details section provides details to exemplify and more clearly illustrate aspects of the present invention, but are in no way intended to be limiting.

Polymer Synthesis:

Synthesis of PSS-b-PMB is illustrated in FIG. 2. Nearly symmetric Polystyrene-b-polyisoprene (PS-b-PI) diblock copolymers were synthesized by a standard anionic polymerization according to procedures described in a paper by K. J. Hanley, T. P. Lodge, and C. I. Huang, in *Macromolecules* 33, 5918 (2000), which is herein incorporated by reference in its entirety. The styrene and isoprene monomers were purchased from Aldrich and were purified by stirring over calcium hydride for 12 h, followed by vacuum distillation with n-butyl lithium for 6 h. Isoprene was treated with dibutyl magnesium for 3 h, followed by n-butyl lithium for 6 h. Cyclohexane was used as the polymerization solvent and was distilled from n-butyl lithium. Using 1.4 M sec-butyl lithium in cyclohexane (Aldrich) as an initiator, the styrene was polymerized for 4 h at 45° C., followed by the addition of isoprene and polymerization for 4 h at the same temperature. Molecular weights of the copolymers ranged from 2,800 to 103,000 g/mol and were determined by the relative ratio between initiator and monomer. For example, for PS-b-PI (1.4K-1.4K), 7.9 mL of 1.4 M sec-butyl lithium in cyclohexane was added to 20 g of styrene in 1 L of cyclohexane, followed by the addition of 20 g of isoprene. All polymers contain about 47 wt % PS with polydispersity indices less than 1.04. Selective hydrogenation of the 1 g of PS-b-PI was conducted in the presence of a homogeneous Ni—Al catalyst with cyclohexane as the solvent, using a 2 L Parr batch reactor at 83° C. and 420 psi, following procedures given in reference by J. L. Adams, D. J. Quiram, W. W. Graessley, R. A. Register, G. R. Marchand published in *Macromolecules* 31, 201 (1998), which is herein incorporated by reference in its entirety. The Ni—Al catalyst was prepared by combining 50 mL of 0.1 M Nickel 2-ethylhexanoate in cyclohexane (Aldrich) with 20 mL of 1.0 M triethylaluminium in heptanes (Aldrich). After the reaction, the catalyst was removed by vigorously stirring the reaction mixture with 10% aqueous citric acid. The hydrogenation reaction was repeated about 4 times until no detectable diene group could be detected in the $^1$H Nuclear Magnetic Resonance (NMR) spectrum of the polymer. All of the NMR experiments were conducted on a 500 MHz Bruker AV500 spectrometer. The NMR spectra also confirmed that the styrene units were not saturated and gel permeation chromatography (GPC) confirmed that there was no chain degradation. The hydrogenated block copolymers are referred to as poly(styrene-b-methylbutylene) (PS-b-PMB) copolymers. The PS blocks of the PS-b-PMB copolymers were then sulfonated using procedures described in reference by N. C. B. Tan, X. Liu, R. M. Briber, D. G. Peiffer published in *Polymer* 36, 1969 (1995), which is herein incorporated by reference in its entirety. 40 mL of 1, 2-dichloroethane and 1 g of PS-b-PMB were added to 100 mL three-neck-flask equipped with a funnel and condenser. The mixture was heated to 40° C. under a N$_2$ blanket and stirred until the copolymer was completely dissolved. Acetic sulfate was prepared by injecting 1.8 mL of acetic anhydride and 5.4 mL of dichloroethane into a sealed N$_2$ purged round bottomed flask. The solution was cooled to 0° C. and 0.5 mL of 96% sulfuric acid was injected into the flask. The acetic sulfate was immediately transferred to the flask containing the PS-b-PMB/dichloroethane mixture at 40° C. using a funnel. The reaction was terminated with 20 mL of 2-propanol. Samples with different degrees of sulfonation were prepared by controlling reaction time. The polymer in the reaction mixture was purified by dialysis against pure water using a cellulose dialysis membrane with a 3,500 g/mol molecular weight cut-off (VWR) for 10 days. The polymer was then recovered by vacuum drying at 60° C. for 7 days.

Typical $^1$H NMR spectra (in d$_6$-acetone) obtained from these samples are also shown in FIG. 2 where spectral peak assignments obtained from P9 are shown. Nonsulfonated styrene units exhibit peaks at 6.4-6.8 ppm (a) and 6.9-7.3 ppm (b). Upon sulfonation, a new peak is obtained at 7.4-7.8 ppm (c). The sulfonation level (SL) of PSS-b-PMB copolymers was calculated by the equation (4):

$$SL = \left(\frac{\text{moles of sulfonic acid}}{\text{moles of styrene}}\right) = \frac{\text{integrals of peak ``}c\text{''}/2}{\text{integrals of(peak ``}c\text{''}/2 + \text{peak ``}b\text{''}/3)} \quad (4)$$

The SL increases with reaction time. The maximum SL value achieved was 95% after 12 h reaction. However, samples having SL above 70% completely dissolved in water and are therefore not of interest in this study. Tables 1 and 2 presented above show the characteristics of the polymers that retained their mechanical integrity in the fully hydrated state.

Small Angle X-Ray Scattering (SAXS):

Synchrotron SAXS measurements were performed using the 15-ID-D beam line at the Advanced Photon Source (APS). Sample temperature was controlled within ±0.2° C. using a sample stage provided by the APS. Samples were equilibrated for at least 15 minutes before measurement. The resulting two-dimensional scattering images were averaged azimuthally to obtain intensity versus scattering wave vector q (q=4π sin(θ/2)/λ, where θ is the scattering angle) profiles. The scattering data were corrected for the CCD dark current and the scattering from air and Kapton windows.

In-Situ Small Angle Neutron Scattering (In-Situ SANS):

The SANS samples were prepared by solvent casting the polymer from THF solutions on 1 mm quartz windows. The sample thickness ranged from 50 to 120 μm and a circular area with a diameter of 1.8 cm was exposed to the neutron beam. The samples were studied using the 30 m NG7 beamline at the National Institute of Standards and Technology (NIST) equipped with a humidity chamber. The wavelength of the incident neutron beam (λ) was 0.6 nm (Δλ/λ=0.10), and sample-to-detector distances of 3.0 m and 12.0 m were used. This enabled access to scattering at q values in the range 0.03-2.5 nm$^{-1}$. The uncertainty of the sample humidity and temperature for the NIST humidity sample chamber are ±1% RH and ±1° C., respectively. Samples were equilibrated for at least 5 minutes before measurement. Separate transient measurements were conducted as a function of sample thickness to ensure that this equilibration time was adequate for the temperature and humidity steps used in this study. Separate experiments were conducted using either 100% $H_2O$ or 100% $D_2O$ as the humidifying component.

Transmission Electron Microscopy (TEM):

Polymer sections with nominal thickness in the 50-80 nm range were cryo-microtomed at −100° C. using an RMC Boeckeler PT XL Ultramicrotome. The electron contrast in dry polymer samples was enhanced by exposure to ruthenium tetroxide ($RuO_4$) vapor for 50 min. Imaging of stained samples was performed with a Zeiss LIBRA 200FE microscope operating at 200 kV equipped with a cold stage (−180° C.) and an Omega energy filter. Images were recorded on a Gatan 2048×2048 pixel CCD camera. (Gatan Inc., Pleasanton, Calif.).

Cryogenic TEM:

Hydrated samples were prepared by immersing thin microtomed sections of the polymer in water. The hydrated sections were frozen using liquid $N_2$ and transferred to a JEOL-3100-FEF electron microscope (JEOL Ltd., Tokyo, Japan) located at the TEM facilities of the LBNL Life Sciences Division. The microscope was equipped with a field emission gun (FEG) electron source operating at 300 kV, an Omega energy filter, a Gatan 2048×2048 pixel CCD camera (Gatan Inc., Pleasanton, Calif.) and cryo-transfer stage. The stage was cooled to −190° C. using liquid $N_2$. Images were acquired under low dose conditions with an exposure below 9.6 $e^-/Å^2$. The slit width of the energy filter was 9 eV, centered on the zero-loss peak, and the defocus value was between 2 and 7 μm.

When the samples were frozen with liquid $N_2$, the water in most of the sample was converted to vitreous ice. This was verified by the presence of diffuse rings in the electron diffraction pattern. It is reported in the literature that vitrification provides the best method for preserving polymer structures in their native state since water expands by only 2-3% during vitrification. The change in block copolymer lattice parameters due to this is expected to be less than 0.5%. In some regions, however, hexagonal ice crystals with sizes less than 100 nm were found, which is probably condensed from the atmosphere. All of the foregoing analysis is based on images obtained from the vitreous ice regions.

Water Uptake Measurements:

Polymer films with thickness ranging from 50 to 70 μm were prepared by solvent casting from 10 wt. % THF solutions. The films were dried at room temperature for 3 days under a $N_2$ blanket and under vacuum at 60° C. for 5 days. Prior to water uptake experiment, the films were exposed to vacuum for 24 hrs and then hooked on the end of the quartz spring balance (RUSKA, spring constant k=0.5 mgf/mm), located in an ESPEC SH-241 humidity chamber equipped with specially designed glassware to prevent breakage of the quartz spring due to air flow in the humidity chamber. The spring is non-rotating and has a reference pointer, which is used to measure the increment of total length of the spring upon hydration. Samples were studied as a function of temperature ranging from 25 to 90° C. and relative humidities from 50 to 98%. The water uptake is calculated using the dry film as the basis according to equation (5):

$$\text{Water uptake} = \frac{\text{weight of wet film} - \text{weight of dry film}}{\text{weight of dry film}} \times 100\% \quad (5)$$

The reported water uptake values are based on measurements from 5 independent samples. The standard deviation of the measurements was less than 5% of the averaged values. Water uptake measurements were also carried out using a balance with 0.01 mg accuracy. Differences between the two measurements were within ±2.5%.

It is customary in the literature to use ion-exchange capacity (IEC) to quantify sulfonation levels. The IEC value quantifies the moles of sulfonic acid (SA) groups per gram of polymer (mmol/g), and is defined as given in (6), $$IEC = \left( \frac{\text{moles of } SA}{\text{moles of } SS \times 185.23 + \text{moles of } S \times 104.15 + \text{moles of } MB \times 70.12} \right) \quad (6)$$

The IEC values were obtained from the polymer characterization results.

Conductivity Measurements:

Proton conductivities of hydrated membranes were measured using AC impedance spectroscopy. Data were collected over a frequency range of 1-10,000 kHz using a 1260 Solatron impedance analyzer. PSS-b-PMB films in the thickness range of 180-210 μm were placed on the BekkTech conductivity clamp to perform four-electrode conductivity tests. Platinum wires provide the electrical contact between the impedance analyzer and the samples.

Morphology of Dry Samples:

SAXS and TEM experiments were used to study the morphology of dry PSS-b-PMB samples. SAXS profiles of P1 series (lowest molecular weight sample) as a function of IEC were obtained. It was observed that a slight increase in IEC from 1.513 to 1.582 mmol/g induces morphological transformation from disordered state to ordered gyroid nanostructure. It is worthwhile to note here that a PS-b-PMB (1.4K-1.4K) pristine block copolymer (before sulfonation) is a liquid with a nearly flat SAXS profile.

Figure 9:
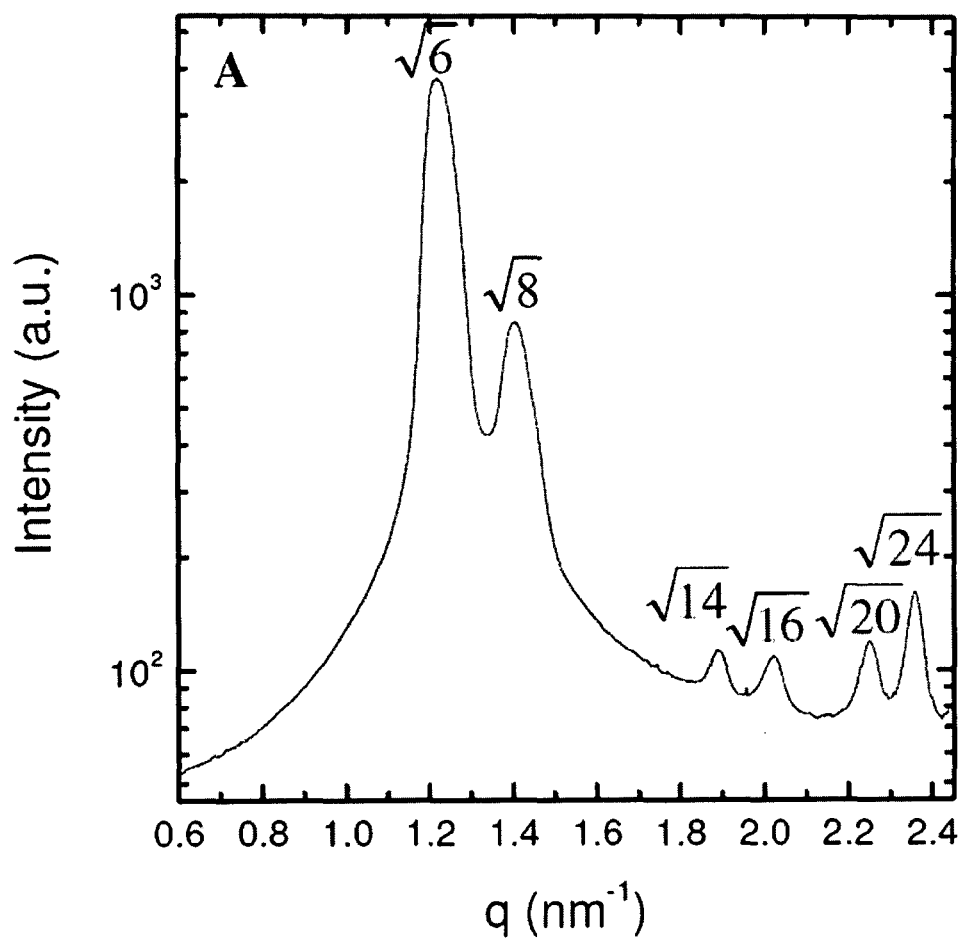
FIG. 9 is a SAXS profile of P1(1.582) sample in dry state illustrating the presence of gyroid structure.
Figure 10A:
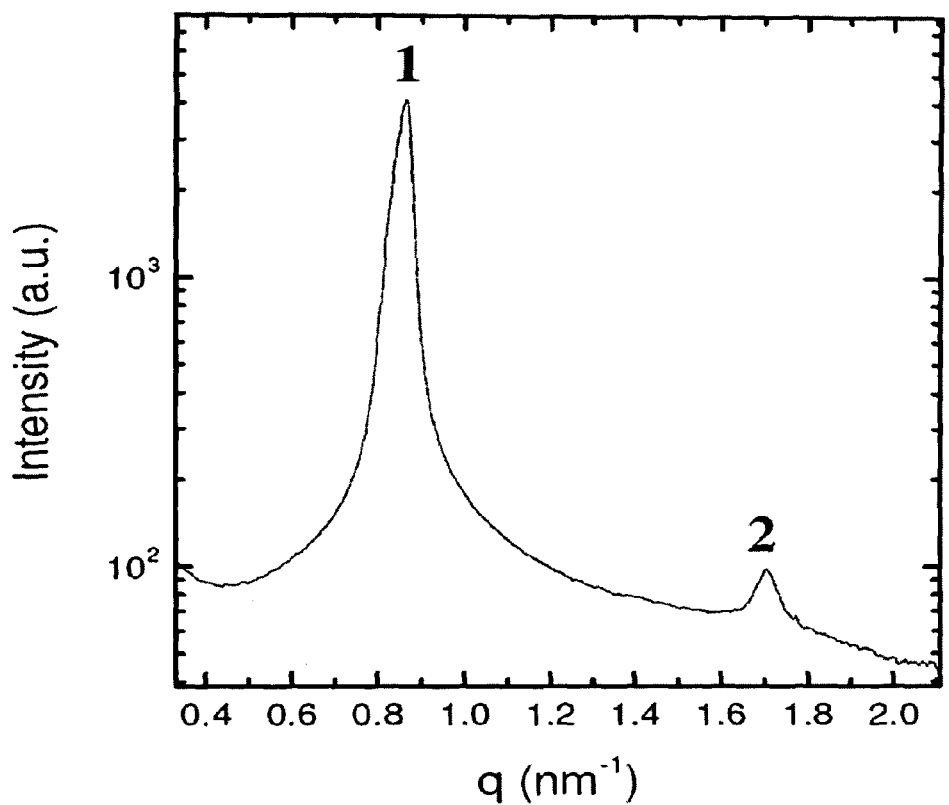
FIG. 10A presents a SAXS profile of P3(1.005).
Figure 10B:
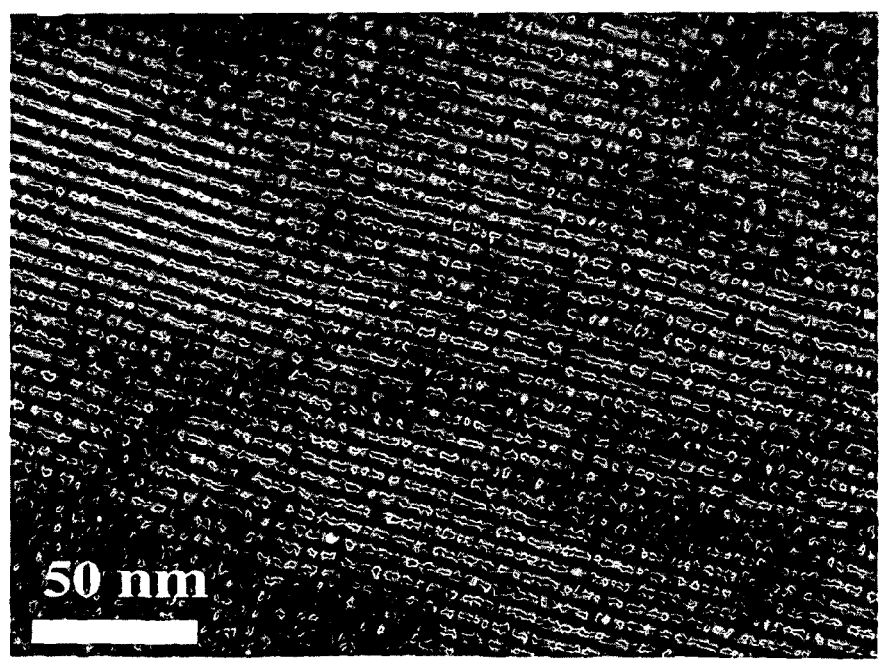
FIG. 10B presents a cross-sectional TEM image of P3(1.005). PSS domain was shown dark by $RuO_4$ staining.
Figure 10C:
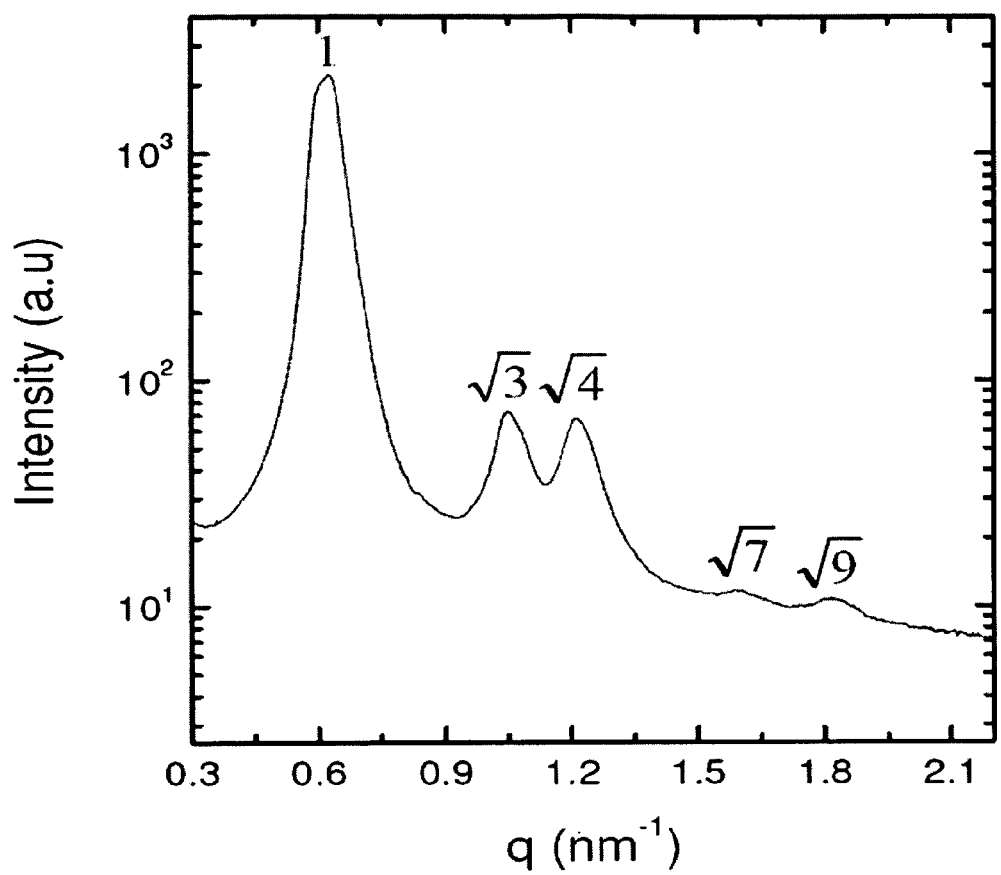
FIG. 10C presents a SAXS profile of P4(1.860).
Figure 10D:
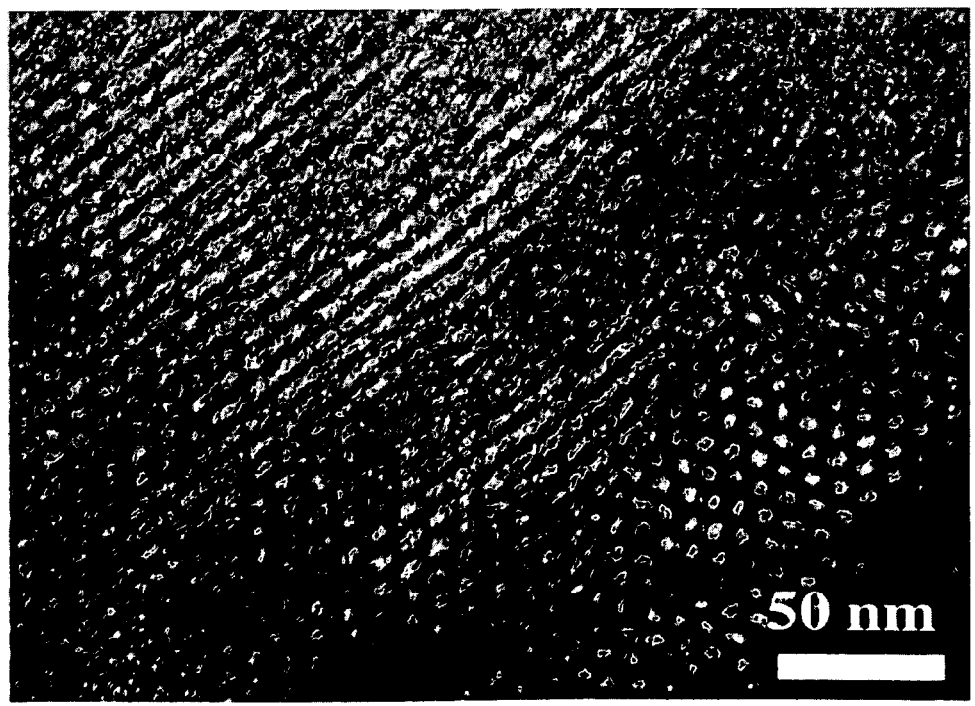
FIG. 10D presents a cross-sectional TEM images of P4(1.860). PSS domain was shown dark by $RuO_4$ staining.
Figure 10E:
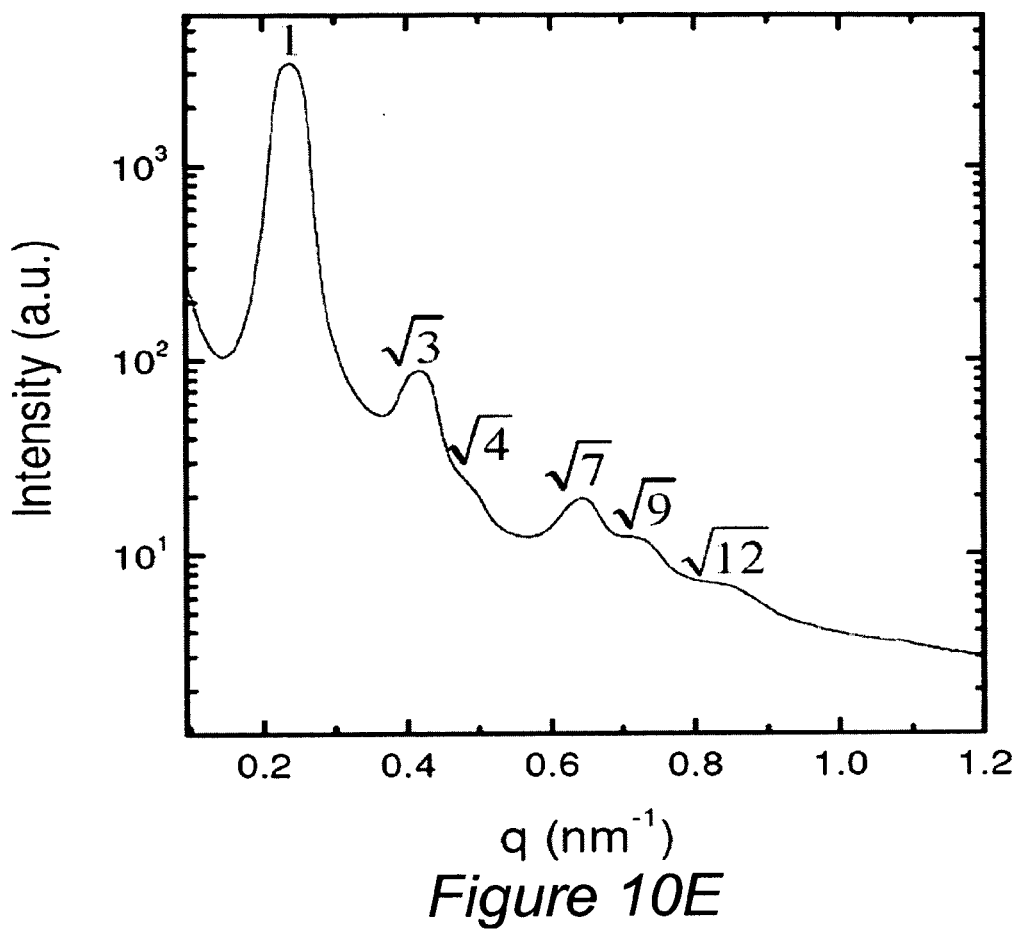
FIG. 10E presents a SAXS profile P9(1.973).
Figure 10F:
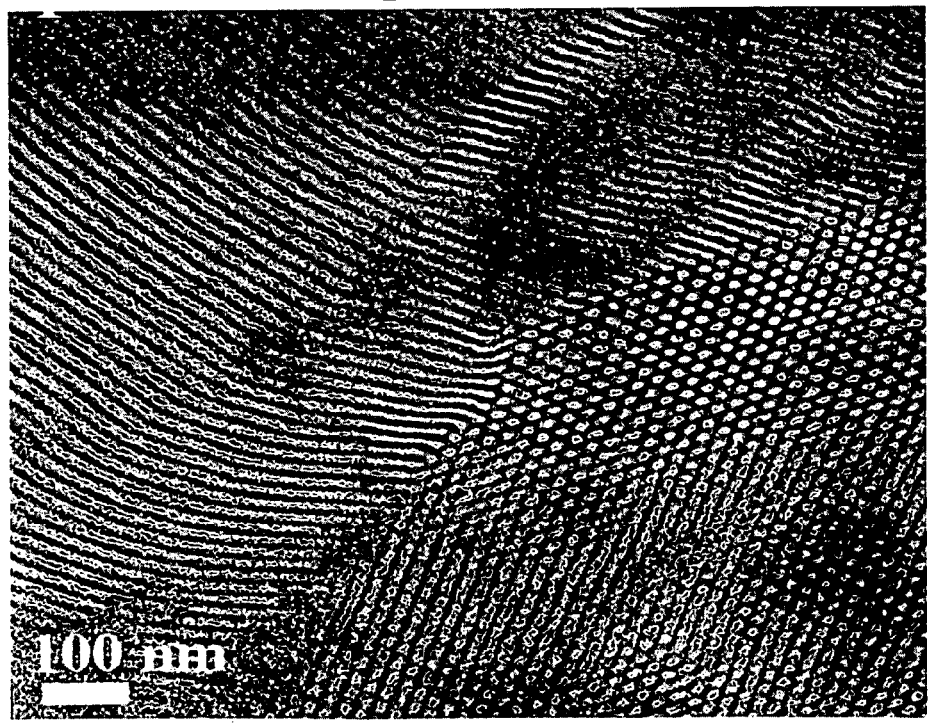
FIG. 10F presents a cross-sectional TEM image of P9(1.973). PSS domain was shown dark by $RuO_4$ staining.

The SAXS profile of P1(1.582) presented in FIG. 9 shows clear characteristics of a gyroid structure. The Bragg peaks at $\sqrt{6}q^*, \sqrt{8}q^*, \sqrt{14}q^*, \sqrt{16}q^*, \sqrt{20}q^*, \sqrt{24}q^*$, where $q^* = 2\pi/d_{211}$ with $d_{211}$=5.15 nm are consistent with the Ia$\bar{3}$d space-group. The Miller indices corresponding to the observed Bragg peaks are (211), (220), (321), (400), (420), and (431). This gyroid morphology was also clearly observed by TEM (micrograph 301 of FIG. 3A). The dimensions of the unit cell as measured by SAXS and TEM are in reasonable agreement. For example, the spacing of the {211}planes (5.2 nm) obtained by SAXS corresponds to the half the "spoke" length observed in TEM (4.8 nm).

P3, P4, and P5 series show a LAM structure at IEC values below 1.005 mmol/g. Typical data obtained form such samples are shown in FIGS. 10 (A) and (B) where SAXS and TEM results from P3(1.005) indicate a lamellar phase with a periodicity of 7.5 nm. The increased IEC value induces the formation of hexagonally perforated lamellae (HPL) morphology. Typical SAXS and TEM data obtained from P4(1.860) are shown in FIGS. 10 (C) and (D). The SAXS data show a series of Bragg peaks at, $q^*, \sqrt{3}q^*, \sqrt{4}q^*, \sqrt{7}q^*$, and $\sqrt{9}q^*$ where $q^* = 2\pi/d_{100}$ with $d_{100}$=10.1 nm. TEM images, shown in FIG. 10 (D), confirm the existence of hexagonal perforations through the lamellae. In PSS-b-PMBs a highly regular HPL phase forms spontaneously and reproducibly after solvent casting. It has been shown in the literature that the HPL structure is metastable in uncharged block copolymers. Demonstrating this fact required extensive annealing of the samples for several weeks. Extensive annealing studies on these samples have not been conducted, and thus it was not determined if the HPL phase is stable or metastable.

Further increase in IEC value induces the formation of hexagonally packed cylinders (HEX). FIG. 10 (E) shows the SAXS profile of P9(1.973) indicating hexagonal symmetry extending up to sixth orders of reflections, $q^*$, $\sqrt{3}q^*$, $\sqrt{4}q^*$, $\sqrt{7}q^*$, $\sqrt{9}q^*$, and $\sqrt{12}\ q^*$, where $q^*=2\pi/d_{100}$ with $d_{100}=22.5$ nm. The TEM image shown in FIG. 10 (F) confirms HEX morphology of the sample viewed along [100] (top area) and [111] (bottom area) direction, respectively. For all PSS-b-PMBs, the Bragg spacing increases with increasing ion content.

It is interesting to note here that these results are markedly different from previous studies of the morphology of sulfonated block copolymers. In the most systematic study to date, SAXS and TEM data on sulfonated poly(styrene-b-isobutylene-b-styrene) (SSIBS) and sulfonated poly(styrene-b-[ethylene-co-butylene]-b-styrene) (SSEBS) membranes indicated that long-range order of the lamellar morphology, obtained in the unsulfonated polymers, was disrupted when IEC was increased above 1.0 mmol/g (SL=36%). These studies were described in a reference by Y. A. Elabd, E. Napadensky, C. W. Walker, and K. I. Winey published in *Macromolecules* 39, 399 (2006) and in a reference by J. Kim, B. Kim, and B. Jung in *J Membrane Sci.* 207, 129 (2002).

Since the tendency for order formation is expected to increase with sulfonation due to increased repulsion between the blocks, the authors attributed this observation to the formation of ionic aggregates. In contrast, the materials studied here showed well-ordered morphologies up to SL values as high as 70%. Disorder is only obtained in the low sulfonation and low molecular weight limit as expected from thermodynamic arguments.

Figure 11:
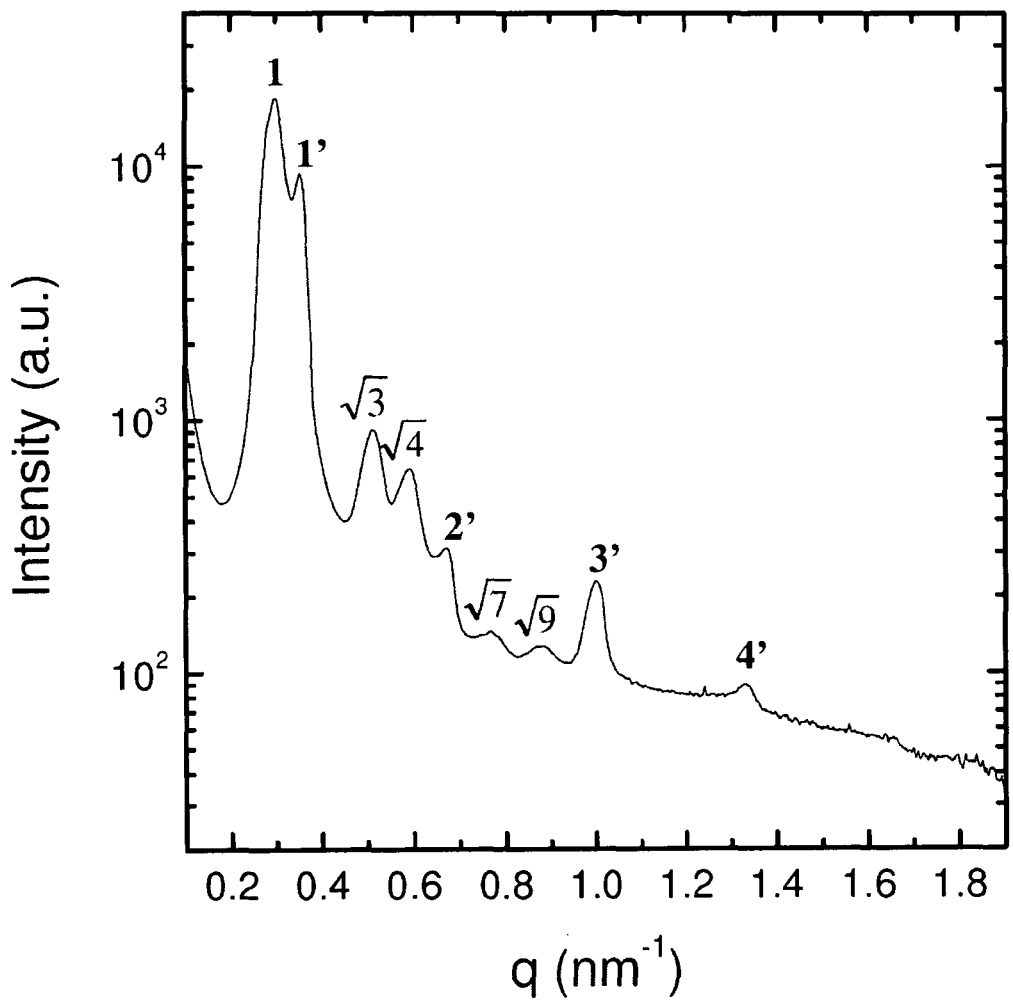
FIG. 11 presents SAXS profiles of P9(0.943) at 25° C. showing the coexistence of LAM and HPL structures. The peaks of 1, $\sqrt{3}$, $\sqrt{4}$ . . . and 1', 2, 3' represent HPL and LAM, respectively.

The methodology outlined above was used to obtain the phase behavior of all of the samples listed in Tables 1 and 2. The LAM+HPL coexistence seen in samples P5, P9, and P48 is probably due to randomness in the sulfonation process. For P9(0.943), the SAXS profile indicating the coexistence of LAM+HPL is shown in FIG. 11 where the peaks labeled $\sqrt{3}$, $\sqrt{4}$ represent the HPL structure while 1', 2', and 3' represent the LAM structure. All of the samples show LAM at low SL and HEX at high SL. The HPL phase is usually found at block copolymer compositions between the LAM and HEX phases, as is the case in the noted systems. It is possible that the randomness of the sulfonation process plays an important role in obtaining the coexisting phases. Taking the P48(0.879) sample as an example, an average of 4.3 sulfonated groups per chain is expected. Due to randomness, however, it is expected that a standard deviation scales as the square root of the number of sulfonated groups. Ignoring prefactors, the sample is expected to contain chains with as few as 3 sulfonated groups per chain as well as chains with as many as 7 sulfonated groups per chain. The expected polydispersity is larger for the lower molecular weight samples. Due to the extremely large Flory-Huggins interaction parameter between PSS and PMB, these changes in sulfonation level could have a profound effect on thermodynamics and equilibrium morphology. It is conceivable that the LAM regions of the coexisting phase contain chains with lower sulfonation levels than those in the HPL regions. It is important to note that equilibrium coexistence of phases in diblock copolymer melts must arise from polydispersity effects. Thus chain polydispersity and composition polydispersity of the PS-PMB chains will also lead to the presence of coexistence windows. It is, of course, also possible that the time scale of equilibration processes for these samples with intermediate sulfonation levels are much larger than those accessed in experiments.

Temperature Dependent Water Uptake:

The temperature dependence of water uptake of the membranes at a fixed IEC value of 2.25±0.24 is shown in FIG. 5, plot 501 (RH=98%) and plot 503 (RH=50%). The qualitative difference between the low molecular weight group and the high molecular group is clear. The water uptake of membranes made from the high molecular weight decreases significantly at temperatures above 50° C. In contrast, the water uptake of the low molecular weight sample is not affected by temperature up to temperatures as high as 90° C.

Figure 12:
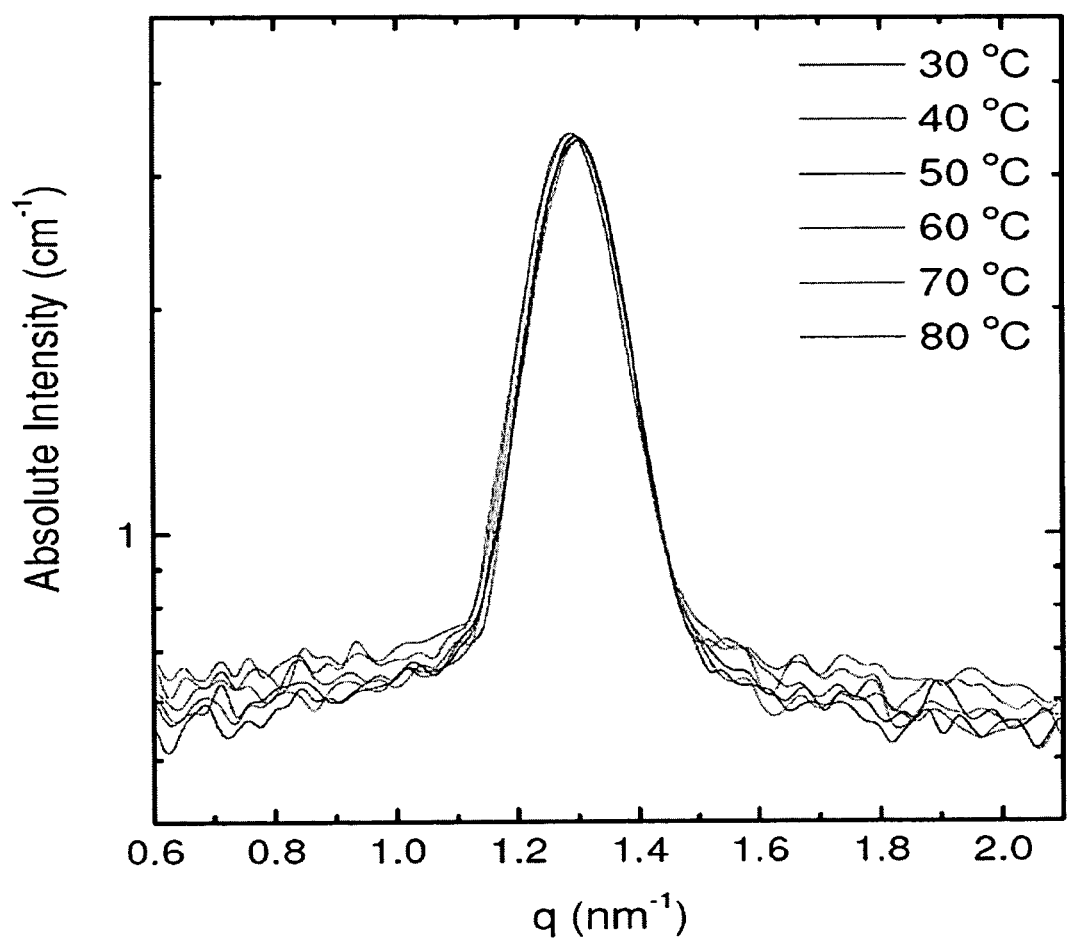
FIG. 12 presents in-situ SANS profiles of P1(1.582) in hydrated state at RH=95% upon heating. The constancy of the profiles indicates that the water is retained in PSS domain up to 80° C.

Temperature-Dependent In-Situ SANS of Hydrated Samples:

Typical temperature-dependent in-situ SANS data obtained from the samples are shown in FIG. 12 where data were obtained from P1(1.582) under RH=95% $H_2O$ vapor. Both $q^*$, which reflects the size of the proton-containing channels, and the peak intensity, which reflects the segregation between hydrophilic and hydrophobic domains do not change as temperature is increased from 30 to 80° C. Obtaining robust membranes with a temperature-independent morphology is important for practical applications because the membranes may be able to maintain their integrity even in the case of a catastrophic failure in temperature or humidity control. It is noted that some of the PEMs described in current literature exhibit considerable swelling at elevated temperatures and high humidity. The swelling is described, for example in an article by Park, M. J.; Downing, K. H.; Jackson, A.; Gomez, E. D.; Minor, A. M.; Cookson, D.; Weber, A. Z.; and Balsara. N. P. published in *Nano Lett.* 2007, 7, 3547 and in an article by Jhao, J.; Majumdar, B.; Schulz, M. F.; Bates, F. S.; Almdal, K.; Mortensen, K.; Hajduk, D. A.; and Gruner, S. M. published in *Macromolecules* 1996, 29, 1204. The lack of swelling of the PEMs described herein is of note.

II Humidity-Induced and Temperature-Induced Phase Transitions in Ion-Containing Block Copolymer Membranes It was discovered that the polymers having improved ability to entrain water exhibit an unusual phase transition behavior. This behavior will be illustrated with reference to the polymers described in the previous sections. The polymers which have an accessible disordered state and an accessible ordered state (e.g., a lamellar or gyroid state) are used. In some examples, both states are accessible at a temperature range of between about −50-500° C., preferably from between about 20-200° C. In some embodiments the disordered state corresponds to a liquid phase polymer, while the ordered state corresponds to a solid state polymer. In these cases the phase transitions are liquid-to-solid and solid-to-liquid transitions.

Figure 13A:
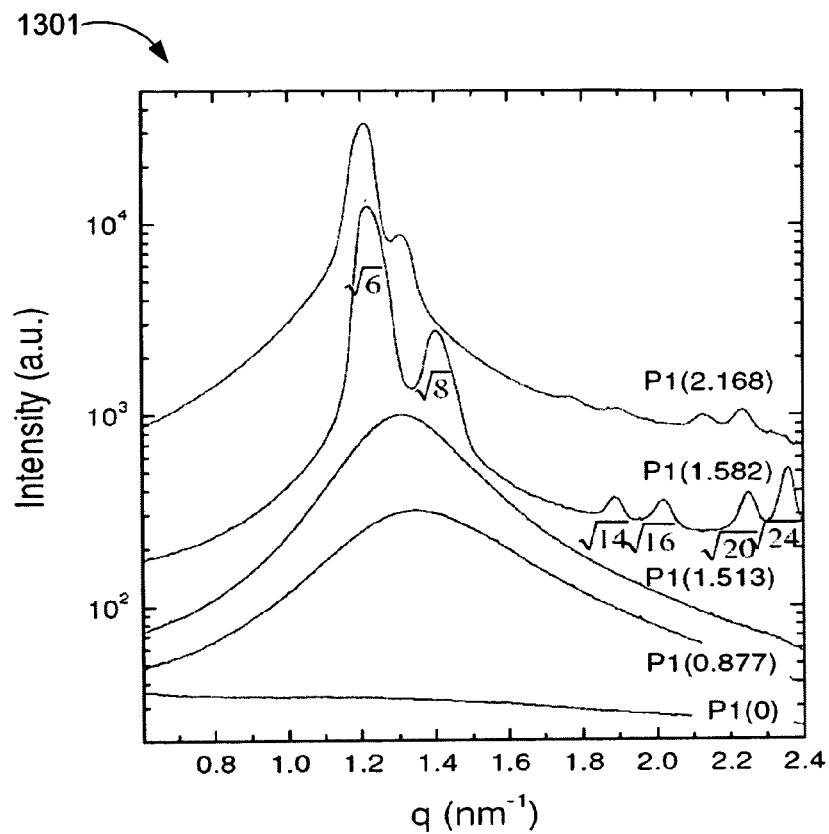
FIG. 13A presents SAXS profiles of P1 series as a function of IEC at 22° C.

The phase behavior of the P1 series in contact with ambient air, air with an approximate relative humidity, RH=32%, was characterized by synchrotron SAXS and cross sectional TEM. The water concentration in the polymer under these conditions is estimated to be less than 3 weight % based on extrapolation of water uptake results. In-situ SANS measurements (described below) show that humidity of the surrounding air affects the phase behavior of PSS-PMB only when RH>54%. For simplicity, the characteristics of PSS-PMB in contact with ambient air (RH<about 50%) are referred to as those of dry PSS-PMB copolymers. The plot 1301 of FIG. 13A shows SAXS profiles for P1 series as a function of IEC at 22° C. P1(0) is a completely disordered low viscosity liquid. Consequently, it is not surprising that the SAXS profile of P1(0) is featureless. Increasing the IEC value from 0 to 1.513 results in the appearance of a broad SAXS peak, characteristic of disordered block copolymers. A slight increase in IEC from 1.513 to 1.582 mmol/g induces morphological transformation from disordered state to an ordered gyroid structure. This increase in IEC also results in the solidification of polymer P1. The Bragg peaks at $\sqrt{6}q^*$, $\sqrt{8}q^*$, $\sqrt{14}q^*$, $\sqrt{16}q^*$, $\sqrt{20}q^*$, $\sqrt{24}q^*$, where $q^*=2\pi/d_{211}$ (d=domain spacing) with $d_{211}=5.15$ nm, seen in plot 1301 are consistent with the Ia$\bar{3}$d space-group. The Miller indices corresponding to the observed Bragg peaks are (211), (220), (321), (400), (420), and (422) Ref. (S13). The gyroid structure is observed over a wide range of IEC values, up to 2.168 mmol/g.

Figure 13B:
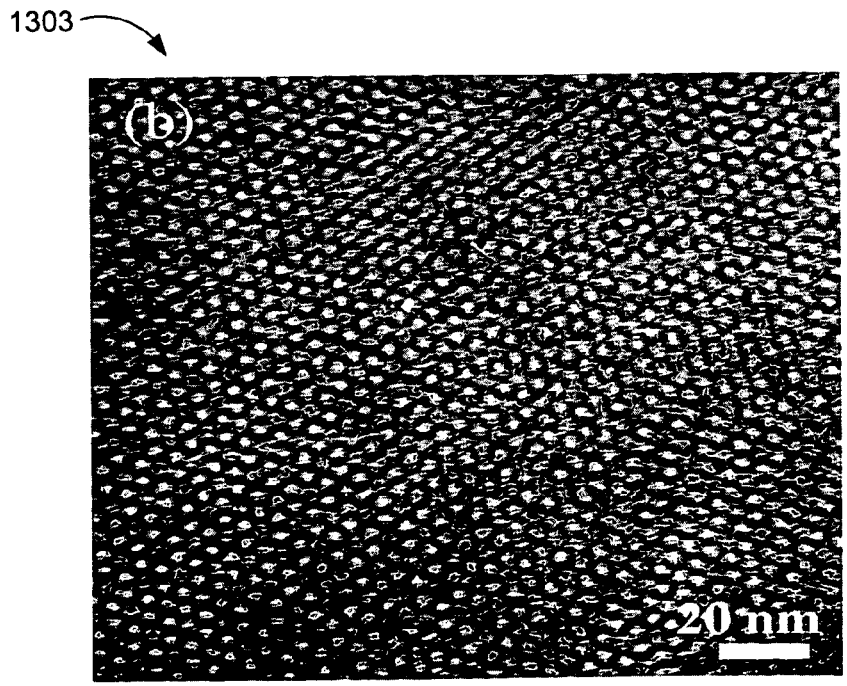
FIG. 13B presents a cross-sectional TEM image of P1(1.582). Scattering profiles are offset vertically for clarity. PSS domain was darkened by $RuO_4$ staining.

This gyroid morphology was also clearly observed by TEM. The cryo-microtomed sections were vacuum dried before the experiments, and the electron contrast in dry samples was enhanced by exposure to ruthenium tetroxide ($RuO_4$) vapor by staining styrene units. FIG. 13B in 1303 shows TEM results from P1(1.582) where the wagon-wheel structure, typically obtained from gyroid samples is seen. The dimensions of the unit cell as measured by SAXS and TEM are in reasonable agreement. For example, the spacing of the {211} planes (5.2 nm) obtained by SAXS corresponds to half the "spoke" length observed in TEM (4.8 nm).

To our knowledge, the smallest block copolymer to exhibit an ordered phase in previous literature is a polyethylene-block-polyethyleneoxide (PE-PEO) copolymer with 0.83 and 0.90 kg/mol PE and PEO blocks, respectively, studied in reference by Sun, L.; Liu, Y.; Zhu, L.; Hsiao, B. S.; and Avila-Orta, C. A. published in *Polymer,* 2004, 45, 8181. This PE-PEO copolymer was disordered above the melting point of the PE and PEO crystals, i.e. microphase separation was driven entirely by the crystallinity of PE and PEO chains, and not thermodynamic repulsion between chains. Consequently, the domain spacing of lamellar structure for the PE-PEO copolymer, which ranged from 7.5 to 11.0 nm, is considerably larger than that expected from typical data obtained from amorphous block copolymers. In comparison, the domain spacing of the gyroid phase of P1(1.582) is 5.2 nm. To our knowledge, the ordered phase in P1(1.582) is the smallest ordered structure obtained by self-assembly in block copolymers.

Figure 14:
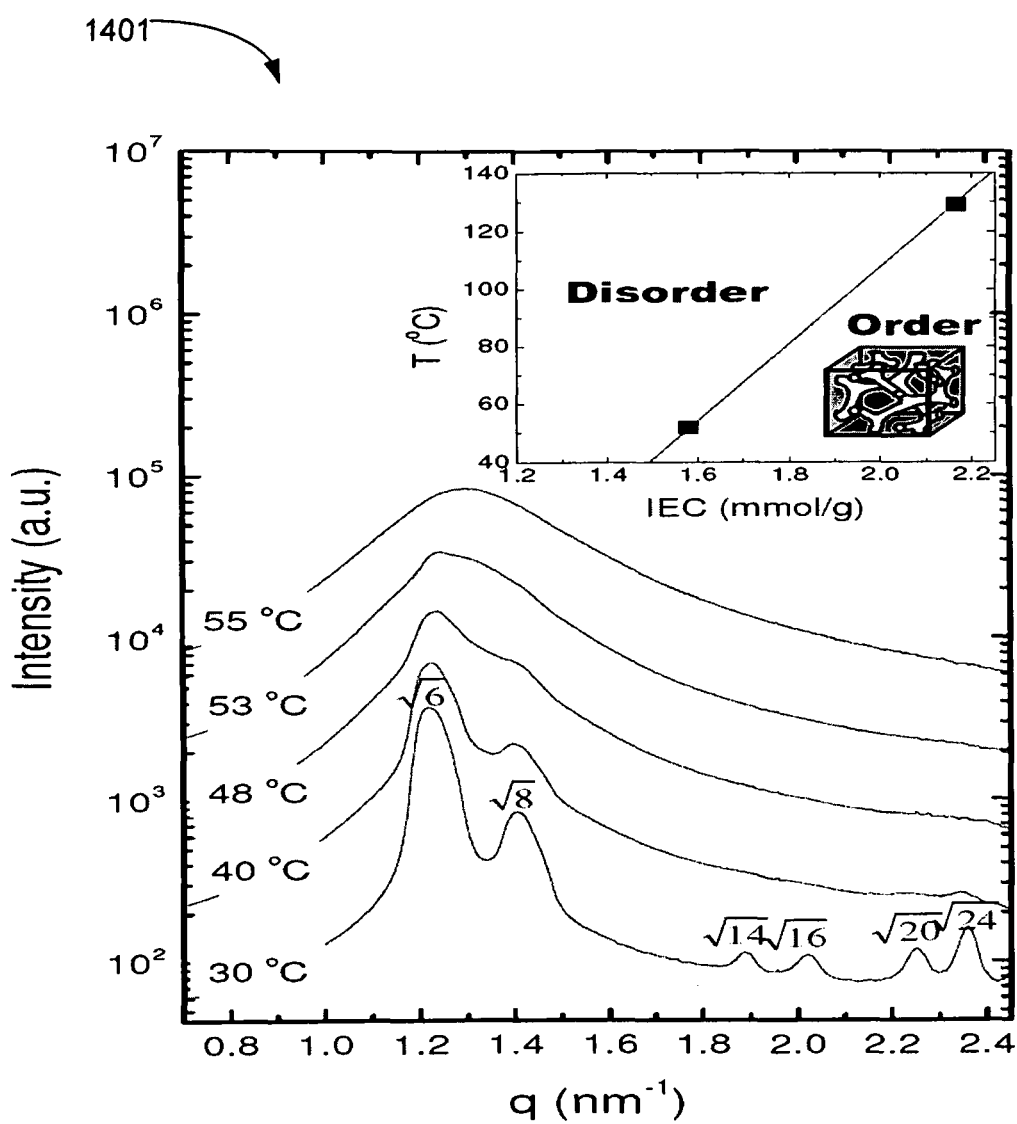
FIG. 14 presents SAXS profiles of the P1(1.582) as a function of temperature indicating ODT at 54° C. Scattering profiles are offset vertically by factors of 3.3, $3.3^2$, $3.3^3$, and $3.3^4$ for clarity. The inset shows the phase diagram of P1 series as a function of IEC value.

FIG. 14 illustrates SAXS profiles of P1(1.582) at selected temperatures and at a RH of about 32%. Temperatures here and throughout the document refer to the temperatures of the heating stage on which the polymer resides. These temperatures are similar, and in some cases are identical to the temperature of the polymer itself. The SAXS profiles at different temperatures were also recorded at this RH value for polymers with different sulfonation (IEC) levels. The SAXS intensity at all accessible q values decreases monotonically with increasing temperature, irrespective of the sulfonation level of the copolymer. Referring to FIG. 14, the higher order peaks of P1(1.582), indicative of the gyroid phase, disappear at a temperature between 53° C. and 55° C. The order-to-disorder (ODT) temperature, $T_{ODT}$, of P1(1.582), is thus 54±1° C. The $T_{ODT}$ of P1(2.168) is seen at 119±1° C. The methodology outlined above was used to map out the phase diagram of the dry P1 series as a function of temperature and IEC and the resulting phase diagram is shown in the inset of FIG. 14.

Figure 15A:
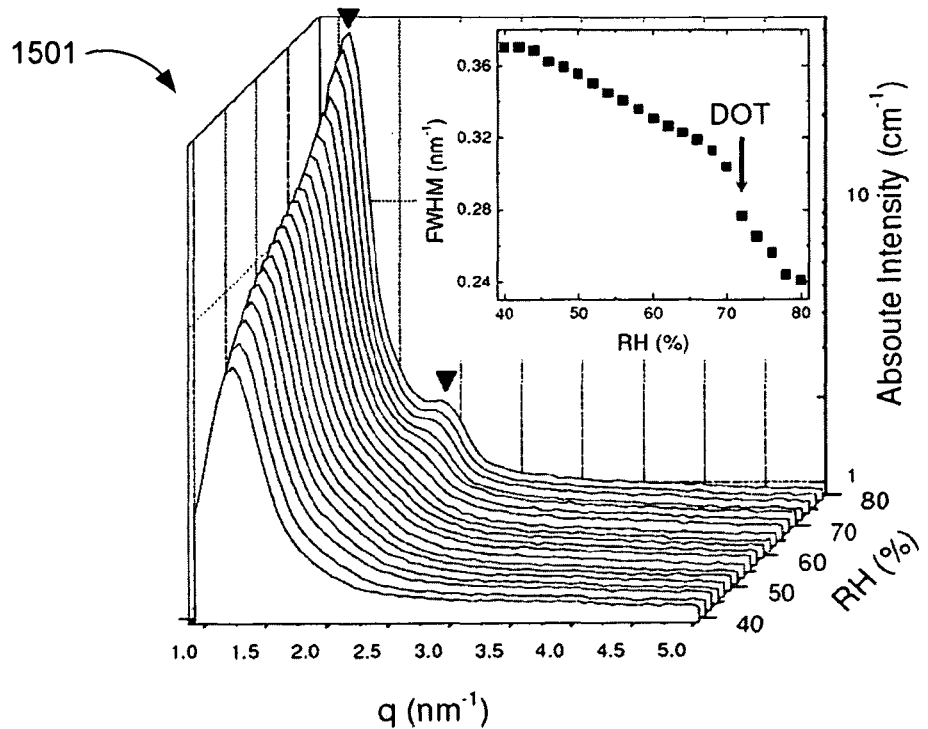
FIG. 15A presents in-situ SANS profiles of P1(1.513) as a function of RH at 25° C. showing humidity-induced disorder-to-order transition. Inset shows a discontinuous change in FWHM of the primary scattering peak at RH=70%.
Figure 15B:
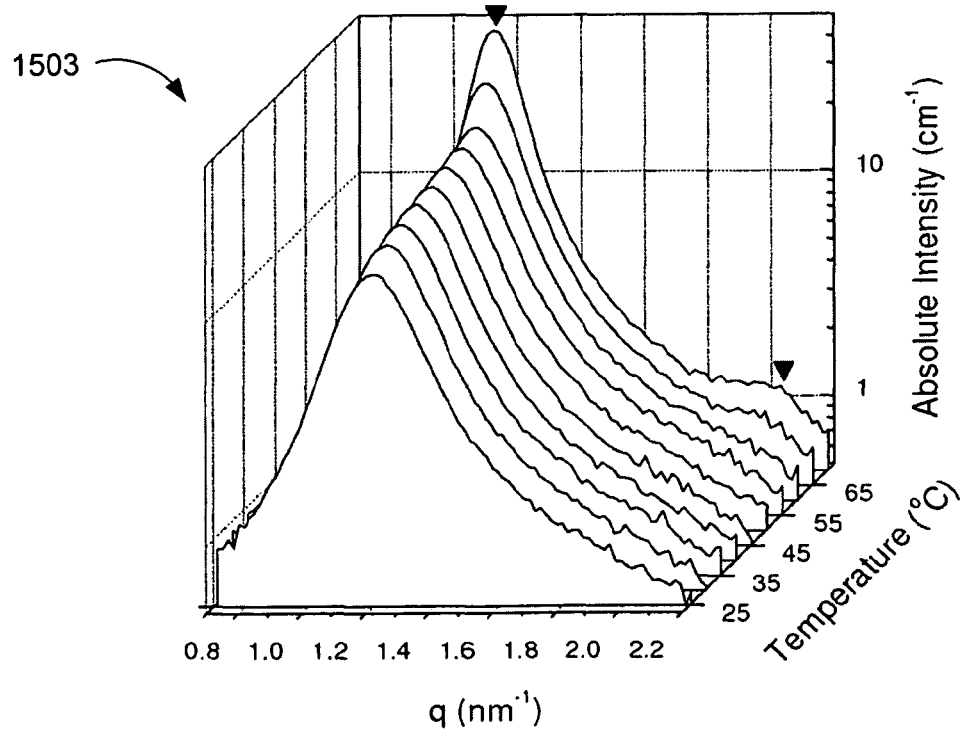
FIG. 15B presents in-situ SANS profiles of P1(1.513) as a function of temperature at RH=60% indicating a temperature-induced disorder-to-order transition.

In-situ small-angle neutron scattering (in-situ SANS) data were obtained from P1 samples placed in a humidity and temperature controlled sample environment (±1% RH and ±1° C.) at the 30 m NG7 beamline at the NIST. The lowest RH limit and the highest temperature limit of the NIST environmental chamber are RH=25% and T=80° C., respectively. The protocols needed to establish equilibrium after changing the temperature and humidity of the surrounding air were determined in independent experiments, as described in a reference by Park, M. J.; Downing, K. H.; Jackson, A.; Gomez, E. D.; Minor, A. M.; Cookson, D.; Weber, A. Z.; and Balsara. N. P. published in *Nano Lett.* 2007, 7, 3547. When a 123 μm thick P1(1.513) film was exposed to a $D_2O$/air environment at fixed temperature of 25° C., as shown in FIG. 15A (plot 1501), the broad primary peak indicative of a disordered phase was seen at low humidity. The scattering intensity increases significantly with increasing RH due to the increase in $D_2O$ concentration within the polymer and the concomitant increase in the scattering contrast between the hydrophobic and hydrophilic microphases. When the RH is increased from 70 to 72%, the 1q*, 2q* Bragg reflections with $q^*=1.15$ nm$^{-1}$ are observed, indicating the presence of a lamellar phase with domain spacing $d_{100}=5.46$ nm. The humidity at which the disorder-to-order transition (DOT) takes place was determined by noting the humidity jump that causes a discontinuous change in the full-width at half maximum (FWHM) of the primary peak, as shown in the inset of plot 1501 of FIG. 15A. Thus, it can be seen that at a constant temperature of about 25° C., the illustrated polymer undergoes a DOT, as the RH increases above the threshold value of about 70%. This is a highly unusual phase transition, which has not been previously observed in any polymer. This characteristic may be directly linked to polymer's improved ability to entrain water.

Typical temperature-dependent in-situ SANS profiles at a fixed humidity are shown in plot 1503 of FIG. 5, where data obtained from P1(1.513) at RH=60% $D_2O$ vapor are shown. The peak intensity increases monotonically with increasing temperature up to a temperature of 60° C. Heating the sample to 65° C. results in an abrupt decrease in FWHM of the peak and the appearance of the 2q* peak corresponding to the lamellar phase. Note that in the dry state (ambient humidity), increasing temperature leads to a decrease in SAXS intensity, regardless of IEC value, and stabilizes the disordered state in samples where the DOT is accessible (as illustrated in FIG. 14). In contrast, increasing temperature results in an increase in the SANS intensity and stabilizes the ordered phase in P1(1.513) at RH=60%. Similar effects were observed at other RH values: $T_{DOT}=75°$ C. at RH=54%, $T_{DOT}=50°$ C. at RH=65%, and $T_{DOT}=35°$ C. at RH=70%. It is evident that the presence of moist air has a qualitative effect on the nature of phase transitions in block copolymers. The DOTs occurring with increasing temperature are highly unexpected and are very rarely observed.

Figure 16:
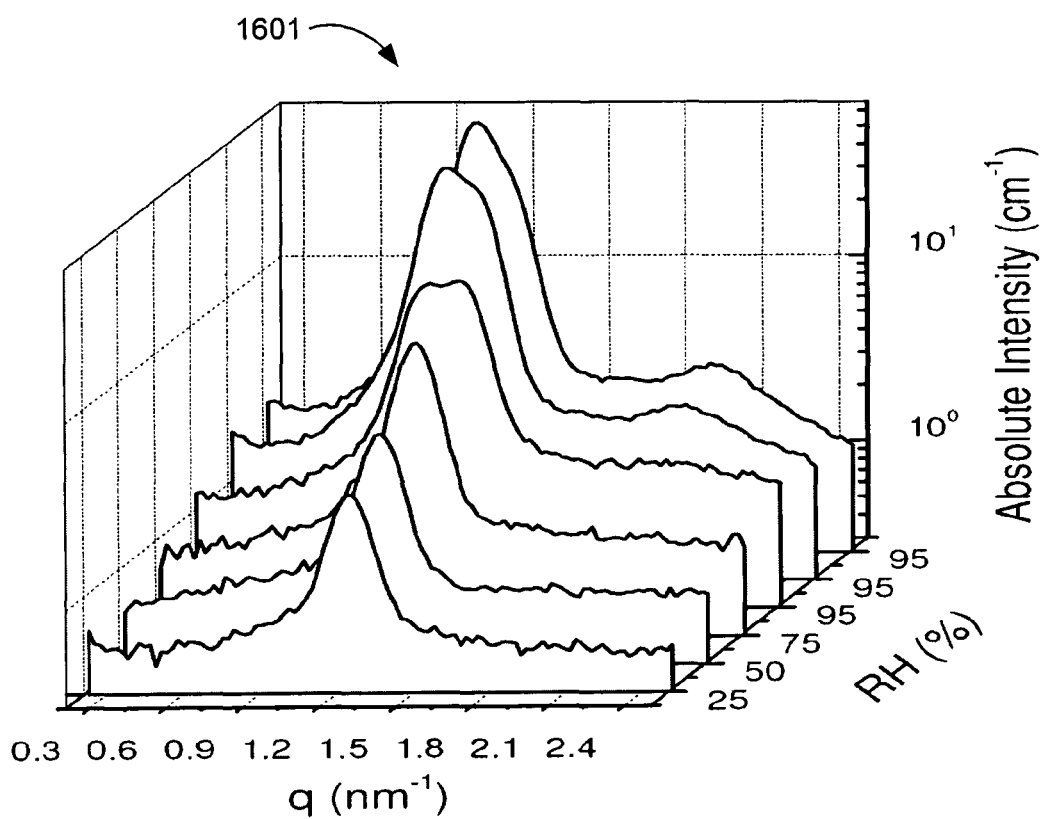
FIG. 16 presents in-situ SANS profiles of P1(1.582) as a function of RH at 25° C. showing a humidity-induced gyroid-to-lamellar transition. The 3 profiles at 95° C. were obtained as a function of time (t) after RH was switched from 75 to 95%; t=30 min, 60 min, and 120 min.

Exposing a dry 97 μm thick P1(1.582) with a gyroid morphology to increasingly moist air at a constant temperature of 25° C. resulted in a humidity induced order-to-order transition (OOT) to a lamellar morphology at RH=95% as shown in FIG. 16. The lack of higher order peaks in the SANS profile at RH=25% is due to well known differences in the resolution of SAXS and SANS instruments. The scattering intensity increases with increasing RH up to RH=75%. When RH was further increased to RH=95%, the nucleation and growth of a lamellar phase with d=5.98 nm was observed. The primary scattering peak of the lamellar phase is distinct from that of the gyroid phase, and this facilitates tracking the gyroid-to-lamellae phase transition. It takes about 2 h to complete the transition. At intermediate times peaks corresponding to both gyroid and lamellar phases were evident (FIG. 16, plot 1601).

Figure 17A:
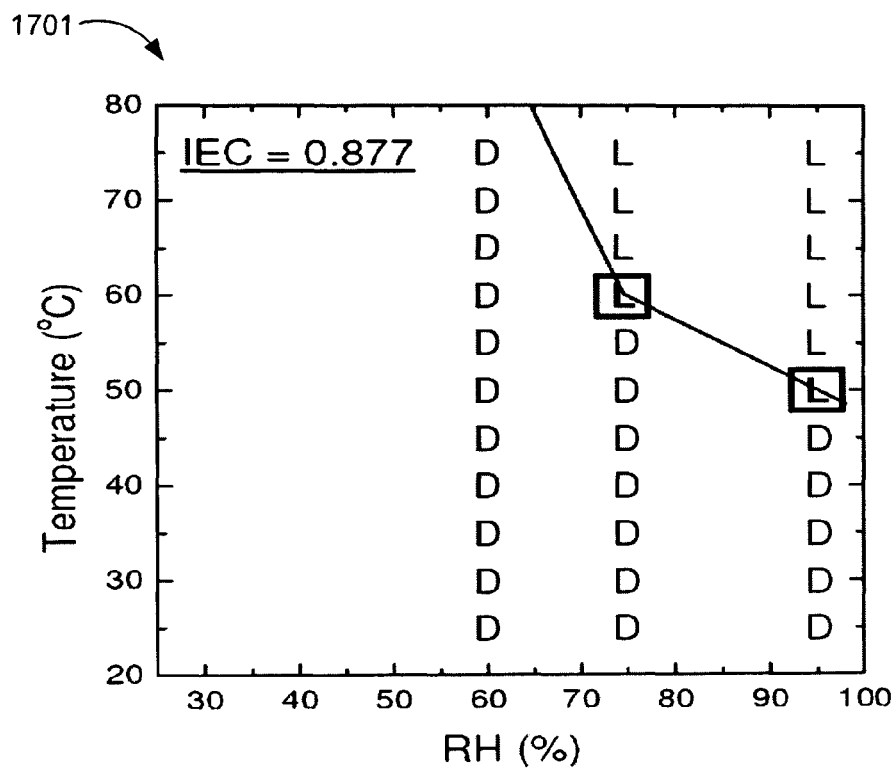
FIG. 17A presents a phase diagram of a P1 sample as a function of T and RH at IEC=0.877. D, L, and G indicate disorder, lamellae, and gyroid phases, respectively. The DOT and OOT are marked with squares and the solid lines.
Figure 17B:
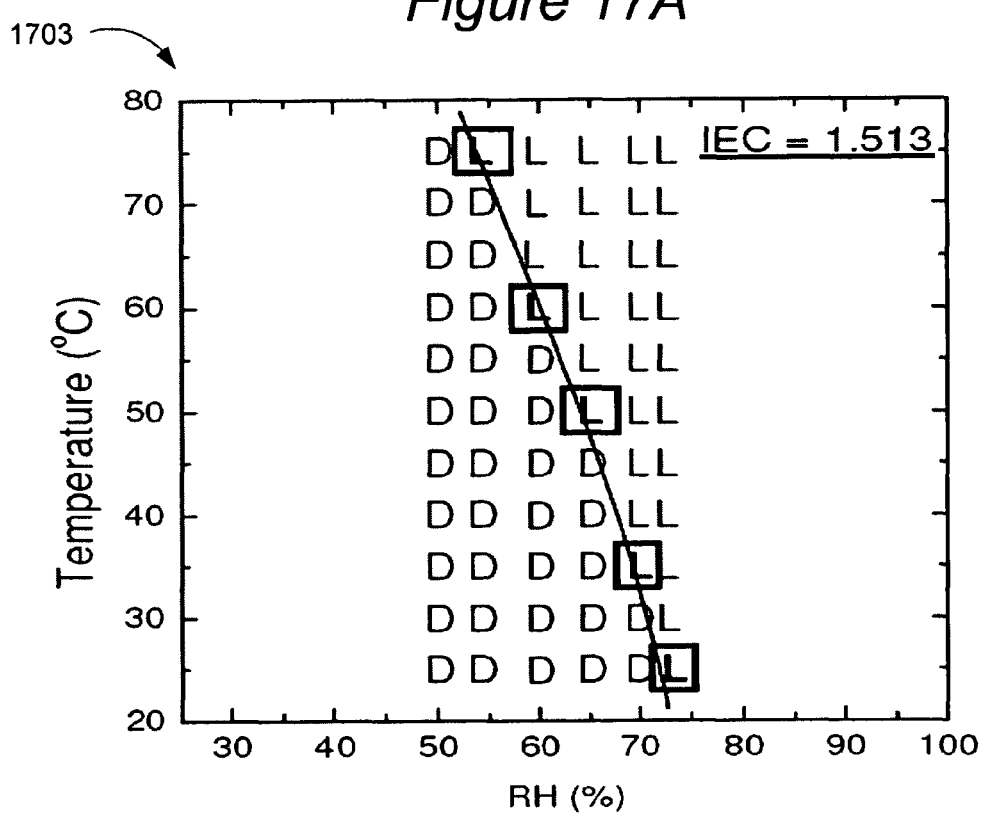
FIG. 17B presents a phase diagram of a P1 sample as a function of T and RH at IEC=1.513. D, L, and G indicate disorder, lamellae, and gyroid phases, respectively. The DOT and OOT are marked with squares and the solid lines.
Figure 17C:
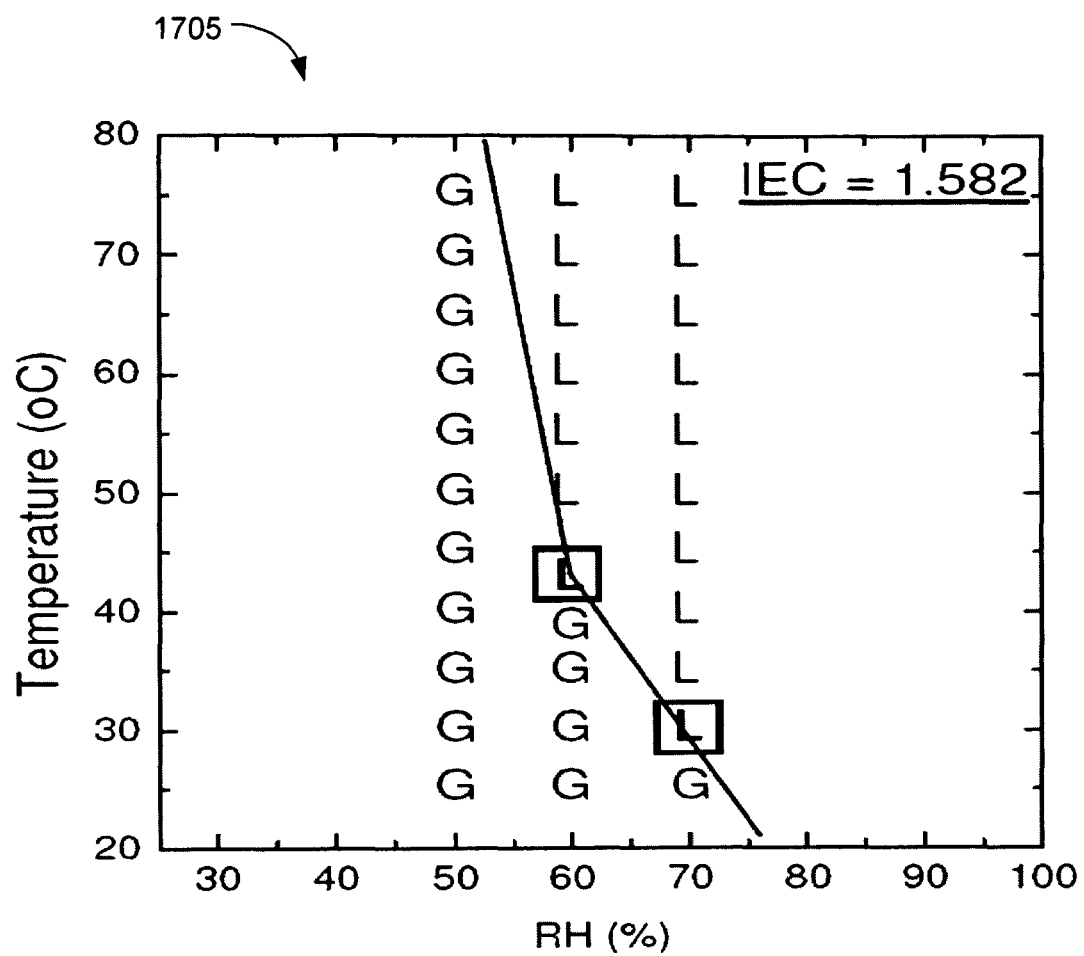
FIG. 17C presents a phase diagram of a P1 sample as a function of T and RH at IEC=1.582. D, L, and G indicate disorder, lamellae, and gyroid phases, respectively. The DOT and OOT are marked with squares and the solid lines.

The methodology described above was used to map out the phase behavior of a variety of P1 samples and the results are summarized in FIGS. 17A-17C in plots 1701, 1703, and 1705 using T versus RH plots at fixed IEC values. The letters D, L, and G indicate disorder, lamellae, and gyroid phases, respectively. The DOTs and OOTs are indicated by squares and the solid lines show the phase boundaries. At a low IEC value of 0.877, disorder is observed over most of the T-RH window with a lamellar phase in the high T, high RH corner. At an intermediate IEC value of 1.513 the T-RH window is more-or-less equally divided between disorder at low temperature and a lamellar phase at high temperature. Qualitatively different behavior is seen at a high IEC value of 1.582 where a gyroid phase is seen at low temperatures and a lamellar phase is seen at high temperatures.

Figure 18:
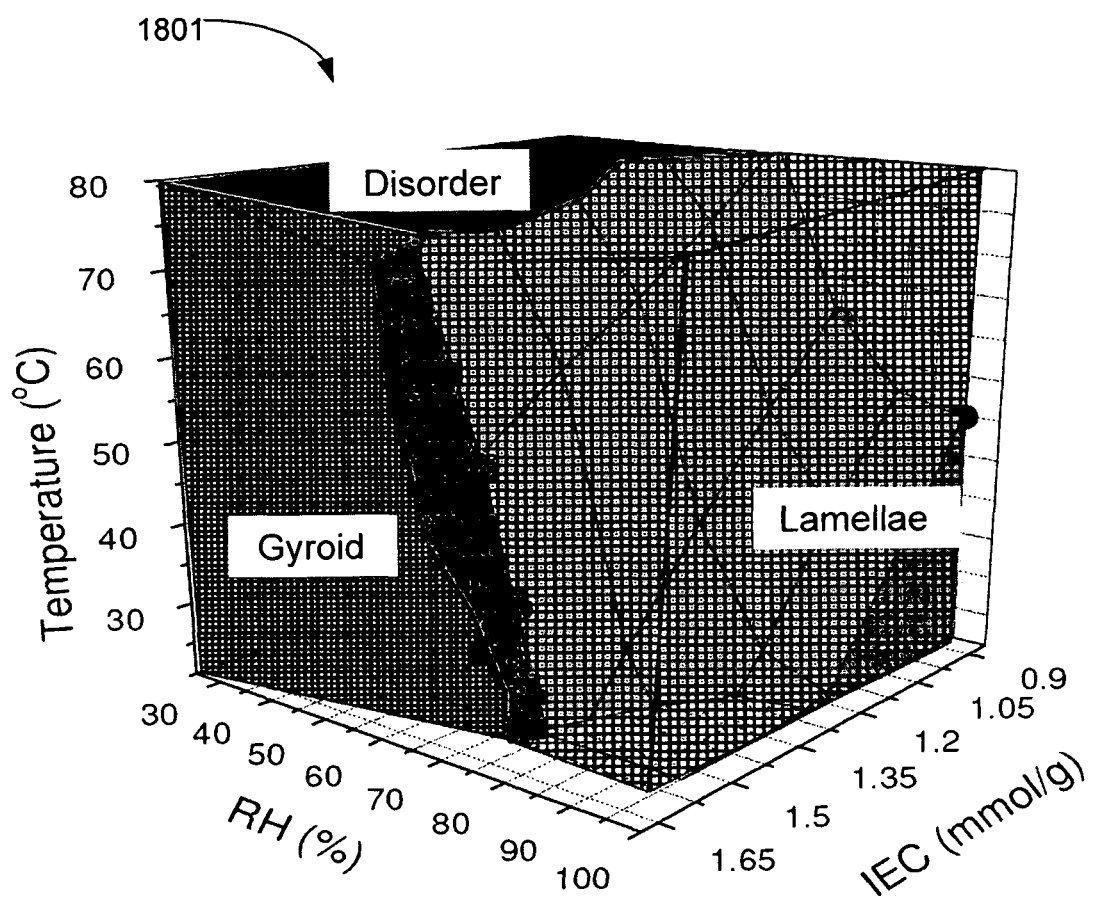
FIG. 18 presents a 3-dimensional phase cube of P1 block copolymer as a function of temperature, T, relative humidity of the surrounding air, RH, and ion content, IEC.

The phase behavior of P1 as a function of temperature, IEC, and humidity of the surrounding air, was obtained by the combination of experiments described above, and the results are plotted inside a cube 1801 in FIG. 18. The left and back surface of the cube at RH=25% represents the phase behavior in dry state, plotted as temperature vs the IEC value, and is identical in content to the inset of FIG. 14. The third axis of the cube represents changes in RH. The disordered phases occupy the low IEC and low RH section of the cube. The gyroid phase is mainly seen at low RH while the lamellar phases are seen at high RH. In FIG. 18, the surfaces between disorder/lamellae and gyroid/lamellae within the cube were obtained using a Renka-Cline gridding algorithm which is part of the OriginPro 7.5® software package.

The phase transition behavior of polymers illustrated in FIGS. 13-18 can be associated with increased ability of the polymer to entrain water.

The results illustrated in FIGS. 13-18 will be now summarized.

In one aspect, the polymers are capable of undergoing a disorder-to-order transition (DOT) while the polymer is exposed to an increasing temperature at a constant relative humidity (RH). For example, at a first constant relative humidity (e.g., at RH of at least about 50%, at least about 80% or at least about 95%) the polymer will exist in an ordered state at a higher temperature and in a disordered state at a lower temperature. The disorder-to-order transition occurs at a certain threshold temperature at a first relative humidity. This is illustrated for example by plot 1503 in FIG. 15B, where the DOT occurs at a first constant RH of about 60% as the temperature is increased above the threshold DOT temperature of about 60° C.

Interestingly, the same polymer may show an opposite behavior at a second relative humidity value. Specifically at a second relative humidity (which is typically lower than the first relative humidity, e.g., less than about 50%, or less than about 30%) the same polymer may be capable of undergoing an order-to-disorder transition (ODT), while the polymer is exposed to an increasing temperature at a constant second relative humidity. For example, at a first relative humidity (e.g., at RH of at least about 50%), the polymer may exist in an ordered state at higher temperature and in a disordered state at a lower temperature, while at a second, lower relative humidity (e.g., at RH of less than about 40%) the polymer may exist in a disordered state at a higher temperature and in an ordered state at a lower temperature. This is illustrated in FIG. 14 for the same polymer P1(1.513), which is shown plot 1503 of FIG. 15B. Referring to FIG. 14, at a constant second relative humidity of about 32%, the polymer undergoes a ODT when the temperature is increased above the threshold Tour value of 55° C.

In some embodiments, a polymer is capable of undergoing a disorder-to-order transition while the polymer is exposed to an increased relative humidity at a constant temperature. In some embodiments, a polymer exists in a disordered state (e.g., in liquid phase) below certain threshold RH and in an ordered state (e.g., in solid phase) above the threshold RH at a constant temperature. This is illustrated by plot 1501 in FIG. 15A, where it can be seen that the polymer undergoes a DOT at a constant temperature of 25° C., as the relative humidity is increased above the threshold $RH_{DOT}$ value of about 70%.

Figure 19:
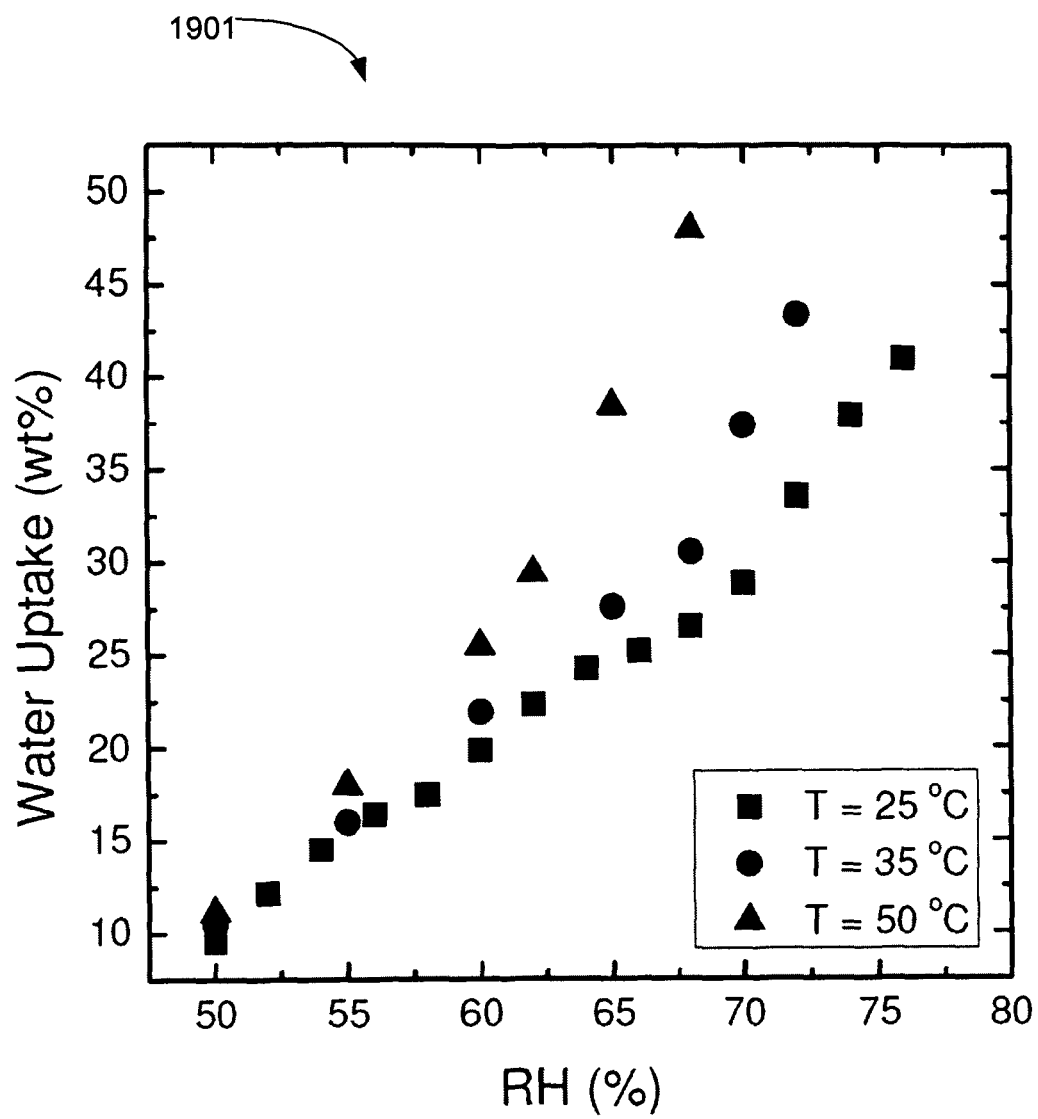
FIG. 19 presents water uptake results from P1(1.513) as a function of humidity at T=25° C., T=35° C., and T=50° C.
Figure 20A:
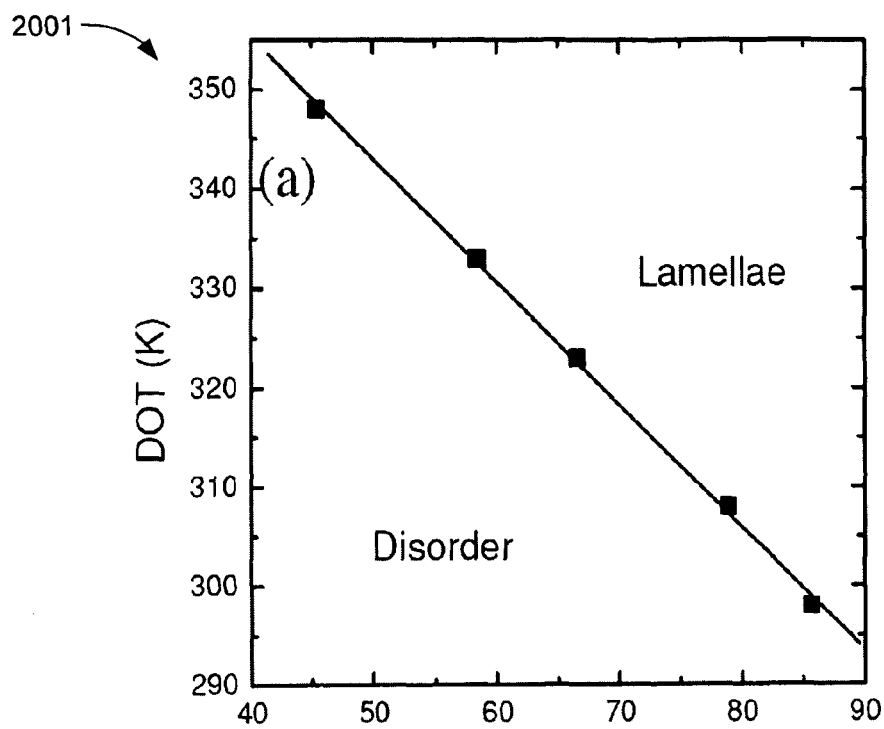
FIG. 20A presents phase behavior of P1(1.513) as a function of molar ratio of water to polymer in the membrane ($n_w/n_p$). The $n_w/n_p$ values were obtained from water uptake measurements shown in FIG. 6.
Figure 20B:
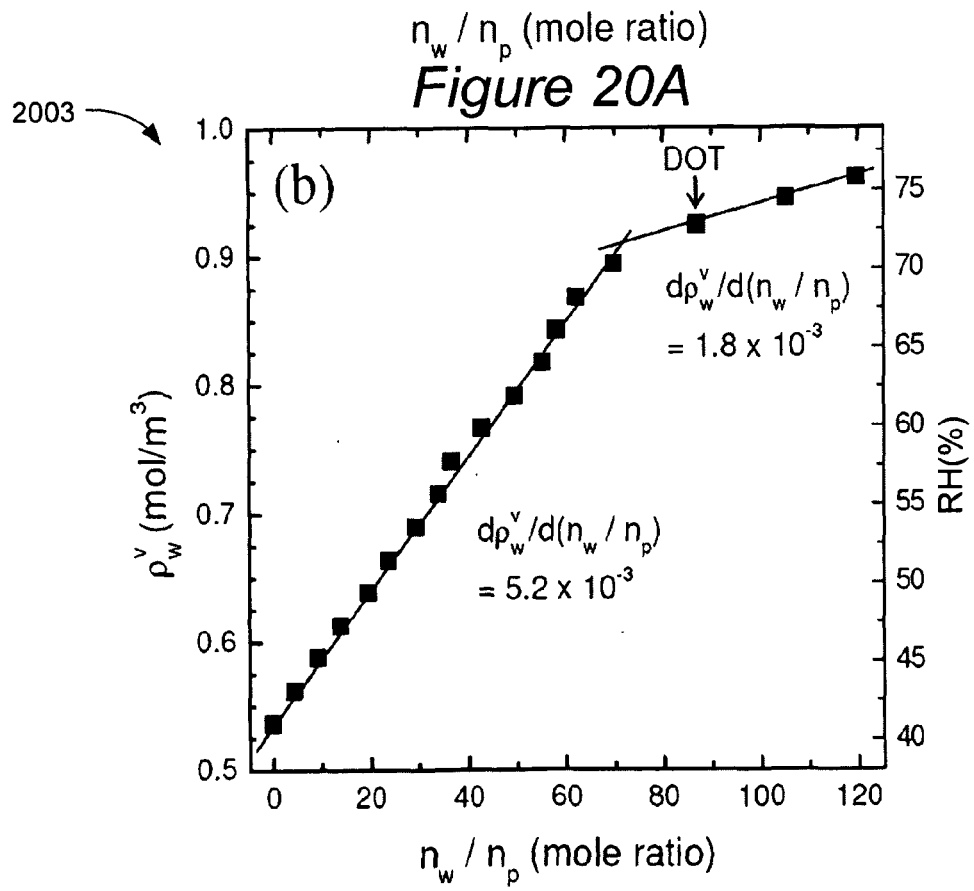
FIG. 20B presents molar concentration of water in the surrounding air ($\rho_w$") at different RH values versus $n_w/n_p$ at 25° C. The DOT determined by in-situ SANS is indicated by an arrow.

The results of water uptake measurements on P1(1.513) as a function of T and RH are shown in FIG. 19. These measurements combined with the in-situ SANS data enable determination of structure as a function of water concentration inside the polymer. The results of this analysis are shown in plot 2001 of FIG. 20 where $T_{DOT}$ of P1(1.513) as a function of water concentration within the polymer. It is evident that $T_{DOT}$ is a linear function of water concentration in the membrane, expressed as $n_w/n_p$, where $n_w$ and $n_p$ represent moles of water and block copolymer, respectively. The slope of the line is −1.15 K.

Equality of the chemical potential of water, $\mu_w$, in the ordered and disordered phases along the coexistence line (e.g. plot 2001 on FIG. 20), indicates that $$\left(\frac{\partial \mu_w^{(O)}}{\partial T}\right)_{n_w} dT + \left(\frac{\partial \mu_w^{(O)}}{\partial n_w}\right)_T dn_w = \left(\frac{\partial \mu_w^{(D)}}{\partial T}\right)_{n_w} dT + \left(\frac{\partial \mu_w^{(D)}}{\partial n_w}\right)_T dn_w \quad (7)$$

where superscripts (O) and (D) represent ordered and disordered phases. Pressure and $n_p$, the other variables that determine $\mu_w$, are assumed to be constant, as is the case in the experiments. Rearranging eq (7) and using Maxwell's equations gives $$\frac{dT}{d(n_w/n_p)} = \frac{\Delta\left(\frac{\partial \mu_w}{\partial (n_w/n_p)}\right)_T}{\Delta s_w} \quad (8)$$

where $s_w$ is partial molar entropy of water, and $\Delta$ refers to the difference between the quantity of interest in the ordered and disordered states, respectively.

Assuming that the surrounding air obeys ideal gas behavior, the chemical equilibrium of water in the membrane and the water vapor in the surrounding air leads to the following expression:

$$\mu_w = \mu_w^v = \mu_w^0 + RT\ln\left(\frac{\rho_w^v}{\rho_w^0}\right) \quad (9)$$

where superscript v stands for the vapor phase, $\rho_w^v$ is concentration of water vapor in the air (moles per unit volume), and the superscript 0 refers to the standard state. Taking the derivative of the $\mu_w$ in eq (9) gives $$\left(\frac{\partial \mu_w}{\partial n_w/n_p}\right)_T = \frac{RT}{\rho_w^v}\left(\frac{\partial \rho_w^v}{\partial n_w/n_p}\right)_T \quad (10)$$

The water-uptake measurements can be recast to give the dependence of $\rho_w^v$ versus $n_w/n_p$. $\rho_w^v$ versus $n_w/n_p$ data of P1(1.513) at 25° C. are shown in plot 2003 in FIG. 20B. Note that eqs. (8) and (10) indicate that there is a change in the slope in the $\rho_w^v$ versus $n_w/n_p$ data at the humidity-induced DOT at constant temperature. This is in reasonable agreement with the data of plot 2003 of FIG. 20. The SANS data indicate that the DOT occurs at $n_w/n_p=87\pm1$, while the change in slope of the $\rho_w^v$ versus $n_w/n_p$ occurs at $n_w/n_p=77\pm8$. Least-squares linear fits thorough the $\rho_w^v$ versus $n_w/n_p$ data obtained in the ordered and disordered states give $\Delta[\partial\mu_w/\partial(n_w/n_p)]_{DOT}=-8.10$ J/mol. Using eq (10) along with the measured slope of the $dT/d(n_w/n_p)$ data enables a measure of $\Delta s_w$, which for P1(1.513) is 7.04 J/(mol·K). Using the same analysis for the other accessible DOTs led to estimates of $\Delta s_w$ of 4.62 and 5.86 J/(mol·K) at T=35° C. and T=50° C., respectively. The average value of $\Delta s_w$ is 5.84 J/(mol·K).

Note that the sign of $\Delta s_w$ is non-trivial. It indicates that the $s_w$ in ordered state is higher than that in the disordered state. Thus, in the provided polymers, according to some embodiments, the partial molar entropy of entrained water is greater in the ordered state than in the disordered state.

Figure 21:
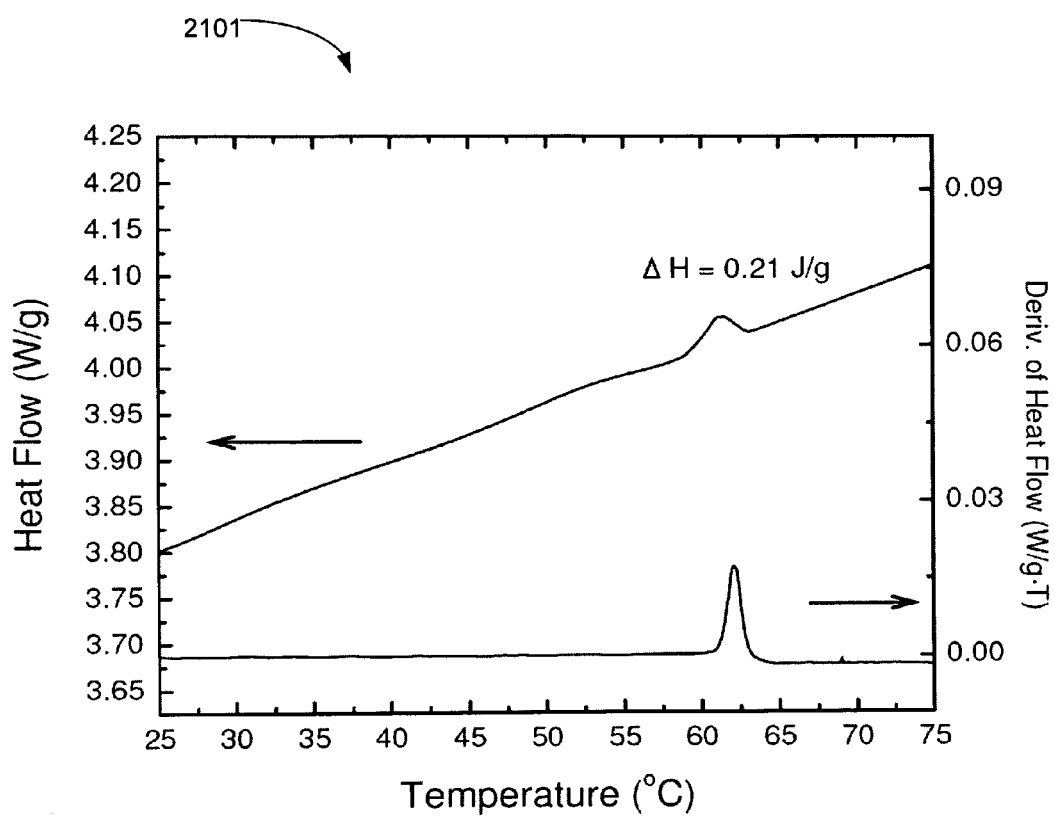
FIG. 21 presents a differential scanning calorimetry (DSC) trace obtained from P1(1.582) at a rate of 1° C./min. The temperature dependencies of heat flow and the derivative of heat flow versus temperature are shown.

The difference between the partial molar entropy of the polymer chains in the ordered and disordered states, $\Delta s_p$, was estimated by conducting DSC on dry P1(1.582) (in ambient air). The data obtained during the second heating run at a rate of 1° C./min is reported in plot 2101 of FIG. 21. A clear endothermic peak is observed in the vicinity of $T_{ODT}$ (60° C.) and the associated latent heat is 0.21 J/g. It is clear that the enthalpy difference between ordered and disordered states, $\Delta H$, is negative, as is usually the case in block copolymers. Since $\Delta H=T\Delta S$ at the ODT, $\Delta s_p$ of P1(1.582) is estimated to be $-2.0$ J/mol·K. The partial molar entropy change of polymer molecules has the usual sign. To obtain an estimate of the factors that govern the thermodynamic properties of PSS-PMB membranes in humid air, it is assumed that $\Delta s_p$ is not affected by the presence of water or small changes in IEC. This enables determination of $\Delta s_{total}$, the total molar entropy of ordering of P1(1.513), as $$\Delta s_{total} = \frac{n_w\Delta s_w + n_p\Delta s_p}{n_w+n_p} = 6.89 \text{ J/mol·}K,$$

which is only slightly smaller than the average $\Delta s_w$ value. It is clear that the total entropy of the system is dominated by that of the water molecules. While $\Delta s_w$ was herein determined for DOTs, it is clear that the same methodology is, in principle, applicable to all of the phase boundaries plotted in FIGS. 17A-17C.

Figure 22A:
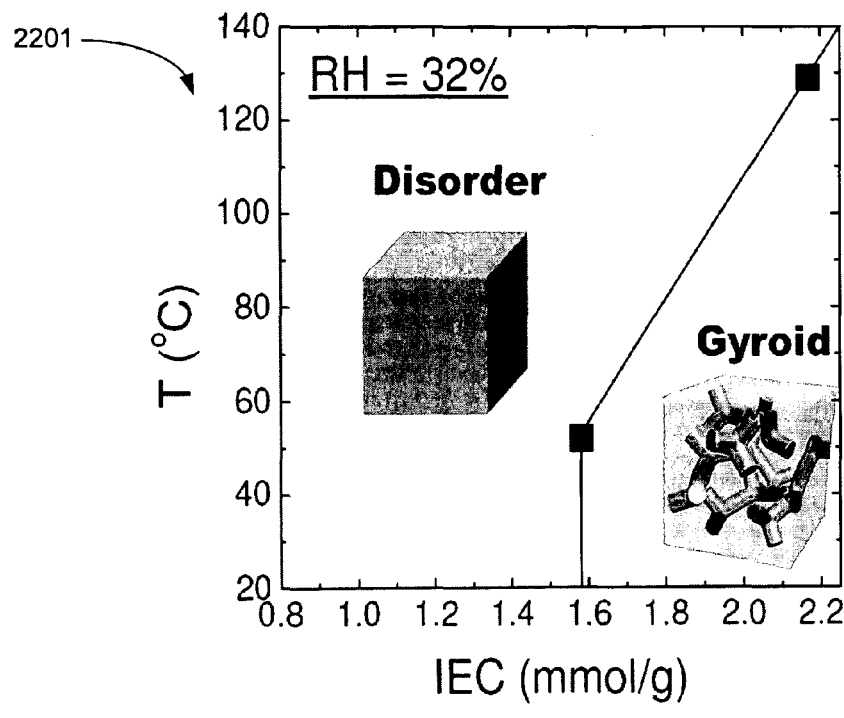
FIG. 22 presents phase diagrams of PSS-PMB samples as a function of T and IEC at given RH values.
Figure 22B:
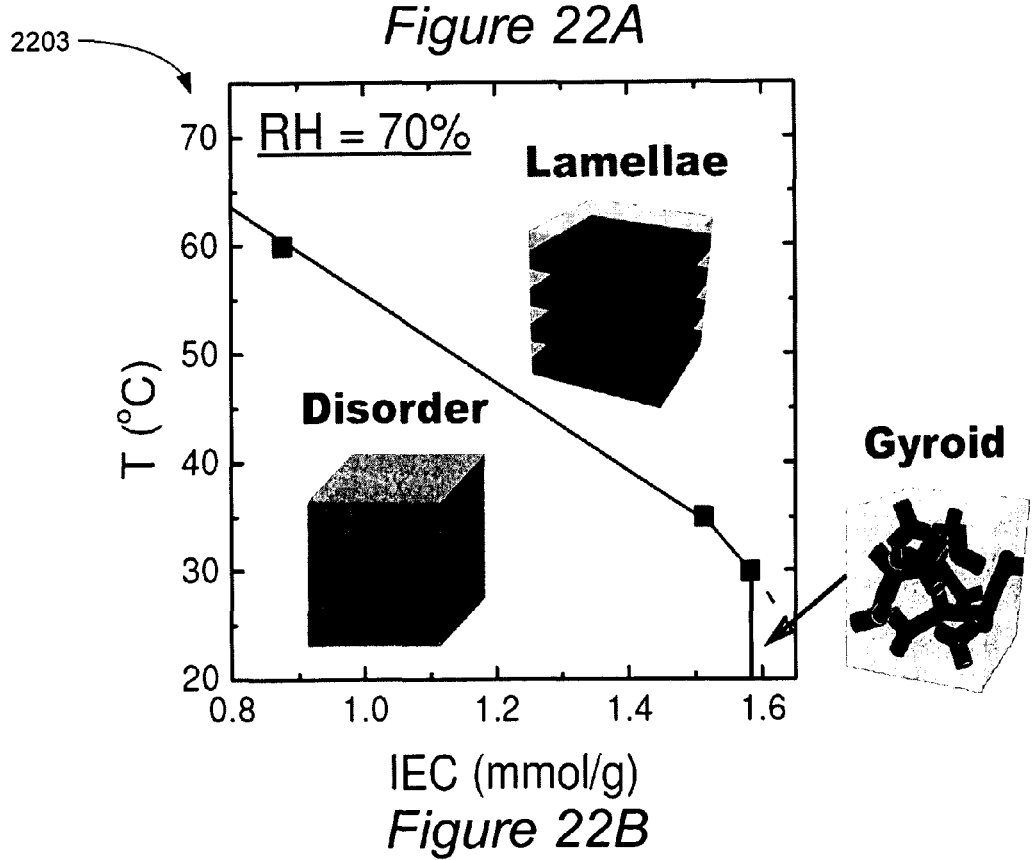

In summary, humidity-induced phase transitions in sulfonated block copolymers were studied as a function of temperature, IEC, and humidity of the surrounding air. The phase behavior is mapped onto a 3-dimensional phase cube, shown in FIG. 18. The disordered phase occupies the low IEC and low RH section of the cube, the gyroid phase is seen at low RH while the lamellar phases are seen at high RH. FIG. 22 further illustrates temperature dependence of phase transitions at a constant RH. As it can be seen from plot 2201, at a low constant RH of 32%, polymers with IEC greater than about 1.6 undergo an ODT from a gyroid ordered state to a disordered state with increasing temperature. Behavior of polymers at a higher constant RH of about 70% is illustrated in plot 2203. In this case, polymers are undergoing DOT (disordered-to-lamellar state) and OOTs (gyroid-to-lamellar state) with increasing temperature.

In addition to phase transition characterization, the change in the partial molar entropy of water in the moist polymer membranes upon ordering was quantified using general thermodynamic arguments that do not rely on specific microscopic models for describing the polymer mixture such as the Flory-Huggins theory or the Random Phase Approximation. Unexpectedly, it was found that partial molar entropy of water within ordered state of the polymer is greater than in its disordered state.

Additional details relating to the synthesis of described polymers and to determination of their properties are described in the article entitled "Phase Behavior of Symmetric Sulfonated Block Copolymers" by M. Park et al. (*Macromolecules;* 2008; 41(10); 3678-3687), in the article entitled "Humidity-Induced Phase Transitions in ion-Containing Block Copolymer Membranes" by M. Park et al. (*Macromolecules;* 2008; 41(6); 2271-2277) and in the article entitled "Increased Water Retention in Polymer Electrolyte Membranes at Elevated Temperatures Assisted by Capillary Condensation by M. Park et al. (*Nano Lett.*; (Letter); 2007; 7(11); 3547-3552), which are herein incorporated by reference in their entireties and for all purposes.

Alternative Embodiments

It is understood that the nanostructured polymers which are provided herein are not limited to the examples described above, and that a variety of polymers defined within the spirit and scope of appended claims may be used. For example, in some embodiments cross-linked nanostructured polymers may be used in PEMs, since they are often more mechanically robust materials. Cross-linked polymers can be synthesized using methods well known to those of skill in the art, e.g., by adding a cross-linking agent (e.g., sulfur) to the block copolymer or by exposing the block copolymer to UV radiation to promote cross-linking, e.g., to form S—S or C—C bonds between polymer chains.

It is understood that while the described materials are particularly advantageous for PEFCs operating at high temperatures and low RHs, the invention is not limited to these particular conditions or applications. The polymeric materials described herein can be used under a variety of conditions, including operation at low temperatures.

In addition, the nanostructured polymers described herein possess characteristics which make them suitable for other applications, beyond PEM application. As it was mentioned, the described polymers may be used, e.g., as new ion-exchange resins, as membranes in liquid filtration systems, and in clothing for protection of the clothes wearer against dehydration. In one aspect, an article of manufacture, such as a water filtration system, an ion-exchange column, or a clothing article, is provided, wherein the article of manufacture includes a nanostructured polymer described herein.

In one embodiment, the polymers described herein are used as ion-exchange resins. The polymer may be fabricated in the form of small beads (e.g., 1-2 mm diameter beads), which may be, optionally packed into an ion-exchange column. The described polymers are suitable for cation exchange, such as for proton exchange or metal cation (e.g., Li, Na, K cation) exchange. The ion-exchange resins can be used in a variety of separation, purification, synthesis, and decontamination processes. Thus, in one embodiment, an article of manufacture provided herein includes an ion exchange resin, which may be optionally packed into an ion exchange column configured for cation exchange, e.g., for proton to metal cation exchange and vice versa.

In another embodiment, an article of manufacture includes a fluid filtration system, e.g., a water filtration system, in which a nanostructured polymer is used in the filtering membrane. The polymer may be fabricated in a membrane form, which is configured such that liquid can pass through the membrane. The small size of the channel within the polymer will allow for effective removal of impurities from water. The described polymers may allow small water molecules to pass through hydrophilic channels, while blocking larger molecules of impurities, or particles. Operation of water purification system includes passing water through polymer-containing membrane, such that impurities are blocked by the membrane, while pure water is allowed to pass through the membrane.

In yet another embodiment, the water-entraining properties of the polymers can be exploited by providing clothing that can protect the wearer of the clothing from dehydration that can occur in hot and dry climates, or during strenuous exercise. In one embodiment, a clothing article of manufacture includes a water-entraining polymer, as described above. The polymer, in some embodiments may be fabricated in a fiber form, which can be incorporated into a textile product. In other embodiments the clothing may include a liner, where the liner comprises a water-entraining polymer as described above, or essentially consists of such polymer. The clothing articles which include the water-entraining polymer may significantly reduce the water loss experienced by the wearer and can, therefore, prolong dehydration-free time or reduce dehydration.

Experimental Details II

This section provides example experimental conditions for the methods used to characterize humidity-induced and temperature-induced phase transitions described in section II. These experimental details are similar but are not always identical to experimental conditions, provided in Experimental Details I section.

Polymer Synthesis and Characterization:

A polystyrene-polyisoprene block copolymer with polydispersity index of 1.03 was synthesized and characterized using methods described previously. Selective hydrogenation of the polyisoprene block was conducted in the presence of a homogeneous Ni—Al catalyst with cyclohexane as the solvent, using a 2 L Parr batch reactor at 83° C. and 420 psi, following previously described procedures. The hydrogenation reaction was repeated about 4 times until no detectable diene group was obtained in the $^1$H Nuclear Magnetic Resonance (NMR in $d_6$-acetone) spectrum of the polymer. All of the NMR experiments were conducted on a 500 MHz Bruker AV500 spectrometer. The NMR spectra also confirmed that the styrene units were not saturated, and gel permeation chromatography confirmed that there was no chain degradation. The hydrogenated block copolymers are referred to as poly (styrene-methylbutylene) (PS-PMB) copolymers. The number averaged molecular weights of the blocks of the PS-PMB copolymer are $M_{n,PS}$=1.4 kg/mol and $M_{n,PMB}$=1.4 kg/mol. The term P1 is used to refer to these polymers where 1 is the nominal molecular weight of each of the blocks in kg/mol. The PS blocks of the PS-PMB copolymer was sulfonated using previously described procedures. Samples with different degrees of sulfonation were prepared by controlling reaction time. The polymer in the reaction mixture was purified by dialysis against pure water using a cellulose dialysis membrane with a 3.5 kg/mol molecular weight cut-off (VWR) for 10 days. Some polymer is lost in this step as the polymer molecular weight is below the cut-off of the dialysis membrane. Controlling the time required for this step is crucial as waiting too long results in loss of the polymer sample while waiting for only a short period of time results in acid contamination of the polymer. NMR measurements were used to determine the acid concentration in the polymer as it was dialyzed. The polymer was then recovered by vacuum drying at 60° C. for 7 days. The sulfonated block copolymers are referred to as polystyrenesulfonate-polymethylbutylene (PSS-PMB) copolymers.

It is customary in the literature to use ion-exchange capacity (IEC) to quantify sulfonation levels. The IEC value quantifies the moles of sulfonic acid (SA) groups per gram of polymer (mmol/g), and is defined as, $$IEC = \left( \frac{\text{moles of } SA}{\text{moles of } SA \times 185.23 + \text{moles of } S \times 104.15 + \text{moles of } MB \times 70.12} \right) \quad (6)$$

Samples are labeled according to the IEC, for example, P1(1.513) has IEC=1.513 mmol/g with 30 mol % sulfonation level while P1(0) refers to the unsulfonated PS-PMB copolymers.

Small Angle X-Ray Scattering (SAXS):

1 mm thick PSS-PMB samples were prepared by solvent casting using THF as a solvent under nitrogen blanket for 2 days followed by vacuum drying at 50° C. for 10 days. Synchrotron SAXS measurements were performed using the 15-ID-D beam line at the Advanced Photon Source (APS). Sample temperature was controlled within ±0.2° C. using a sample stage provided by the APS. Samples were equilibrated for at least 15 minutes before measurement. The resulting two-dimensional scattering data were averaged azimuthally to obtain intensity versus magnitude of the scattering wave vector q (q=4π sin(θ/2)/λ, where θ is the scattering angle). The scattering data were corrected for the CCD dark current and the scattering from air and Kapton windows.

Transmission Electron Microscopy (TEM):

The PSS-PMB samples prepared by the same method used to prepare the SAXS samples were cryo-microtomed at −100° C. to obtain thin sections with thicknesses in the 50-80 nm range using an RMC Boeckeler PT XL Ultramicrotome. The electron contrast in the dry polymer samples was enhanced by exposure to ruthenium tetroxide ($RuO_4$) vapor for 50 min. Imaging of stained samples was performed with a Zeiss LIBRA 200FE microscope operating at 200 kV equipped with a cold stage (−160° C.) and an Omega energy filter. To prevent beam damage, the polymer sections evacuated at $10^{-5}$ Pa were placed on the cold stage before they were exposed to the electron beam. Images were recorded on a Gatan 2048×2048 pixel CCD camera. (Gatan Inc., Pleasanton, Calif.). All data sets were acquired using Digital Micrograph (Gatan, Inc.) software. The TEM images thus enable quantification of the room temperature morphology of our PSS-PMB copolymers.

In-Situ Small Angle Neutron Scattering (In-Situ SANS):

The SANS samples were prepared by solvent casting the polymer from THF solutions on 1 mm quartz windows. The sample thickness ranged from 50 to 130 μm and a circular area with a diameter of 1.8 cm was exposed to the neutron beam. The samples were studied using the 30 m NG7 beamline at the National Institute of Standards and Technology (NIST) equipped with a sample holder wherein the humidity of the surrounding air and sample temperature were controlled. Water from a well located within the sample chamber is used to humidify the air around the sample. In our experiments, the well was filled with pure $D_2O$. The wavelength of the incident neutron beam ($\lambda$) was 0.6 nm ($\Delta\lambda/\lambda=0.10$), and sample-to-detector distances of 1.0, 3.0 and 12.0 m were used. This enabled access to scattering at q values in the range 0.03-5.9 $nm^{-1}$. The uncertainty of the sample humidity and temperature for the NIST humidity sample chamber are ±1% RH and ±1° C., respectively. Samples were equilibrated for at least 5 minutes before measurement. Separate transient measurements were conducted as a function of sample thickness to ensure that this equilibration time was adequate for the temperature and humidity steps used in our study.

Water Uptake Measurements:

Polymer films with thickness ranging from 50 to 70 µm were prepared by solvent casting from 10 wt. % THF solutions. The films were dried at room temperature for 3 days under a $N_2$ blanket and under vacuum at 60° C. for 5 days. Prior to water uptake experiment, the films were exposed to vacuum for 24 hrs and then hooked on the end of the quartz spring balance (RUSKA, spring constant k=4.9 mN/m), located in an ESPEC SH-241 humidity chamber equipped with specially designed glassware to prevent breakage of the quartz spring due to air flow in the humidity chamber. The spring is non-rotating and has a reference pointer, which is used to measure the increment of total length of the spring upon hydration. Samples were studied as a function of temperature ranging from 25 to 90° C. and RHs from 50 to 98%. The water uptake is calculated using the dry film as the basis:

$$\text{Water uptake} = \frac{\text{weight of wet film} - \text{weight of dry film}}{\text{weight of dry film}} \times 100\% \quad (5)$$

The reported water uptake values are based on measurements from 5 independent samples. The standard deviation of the measurements was less than 5% of the averaged values. We also carried out water uptake measurements using a Mettler balance with 0.01 mg accuracy. Differences between the two measurements were within ±2.5%.

Differential Scanning Calorimetry (DSC).

DSC experiments were performed with a TA instruments DSC model 2920 with a heating rate of 1° C./min. The instrument was calibrated using indium, zinc, and tin. For the measurement, approximately 10 mg of dry polymer was encapsulated in an aluminum pan using a sample press and run against an empty aluminum reference pan.

Various details have been omitted for clarity's sake, and various design alternatives may be implemented. Therefore, the present examples are to be considered as illustrative and not restrictive, and the invention is not to be limited to the details given herein, but may be modified within the scope of the appended claims.

What is claimed is:

1. A polymer electrolyte membrane (PEM) comprising a portion forming proton-conductive channels within the membrane, wherein the channels have a width of less than about 6 nm.

2. The membrane of claim 1, wherein the portion comprises a hydrophilically functionalized polymer.

3. The membrane of claim 2, wherein the hydrophilically functionalized polymer is a sulphonated polymer.

4. The membrane of claim 1, wherein the width of the channels is less than about 5 nm.

5. The membrane of claim 4, wherein the width of the channels is less than about 3 nm.

6. The membrane of claim 1 further comprising a block copolymer, wherein the copolymer comprises hydrophilic and hydrophobic blocks.

7. The membrane of claim 6, wherein the block copolymer forms an ordered nanostructure.

8. The membrane of claim 7, wherein the block copolymer forms an ordered nanostructure in a hydrated state.

9. The membrane of claim 7, wherein the ordered nanostructure is a lamellar structure or a gyroid structure.

10. The membrane of claim 6, wherein the block copolymer has a molecular weight of less than about 9,000 g/mol.

11. The membrane of claim 6, wherein the hydrophilic block comprises sulfonate groups.

12. The membrane of claim 6, wherein the block copolymer comprises polystyrenesulfonate-block-polymethylbutylene (PSS-b-PMB).

13. The membrane of claim 12, wherein the PSS-b-PMB has a molecular weight of less than about 8,000 g/mol.

14. The membrane of claim 6, wherein the hydrophilic block comprises aryl groups and wherein less than about 60% of the aryl groups are sulphonated.

15. The membrane of claim 1, wherein the membrane has a proton conductivity of at least about 0.15 S/cm at a temperature of greater than about 60 degrees C.

16. The membrane of claim 1, wherein the membrane retains a greater amount of water at a higher temperature than it retains at a lower temperature.

\* \* \* \* \*